April 6, 1948. D. W. MOLINS ET AL 2,439,142
LOADING AND FIRING MECHANISM FOR QUICK-FIRING GUNS
Filed May 25, 1943 19 Sheets-Sheet 2
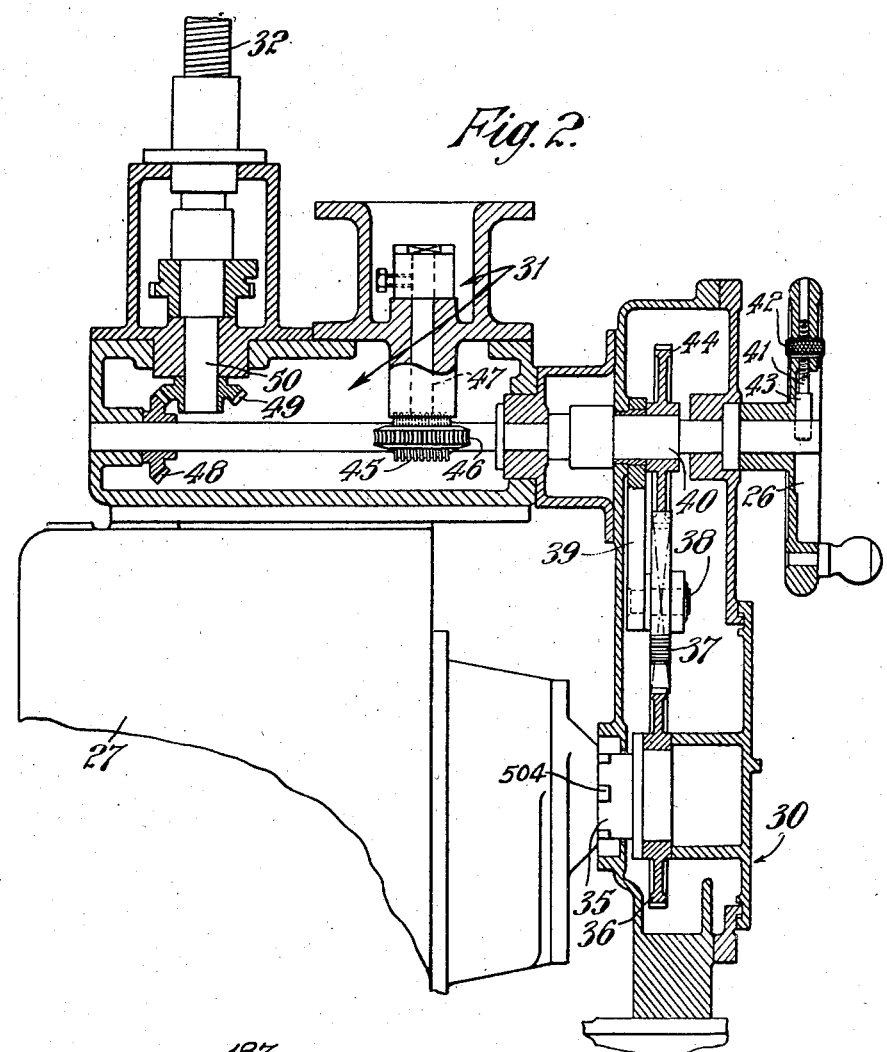
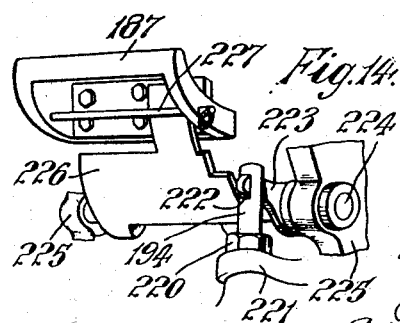
Inventors
Desmond Walter Molins
Valentine Pearce Harvey
James Arthur Mason
Gordon Francis Wellington Powell
By Loyd Hall Sutton
Attorney

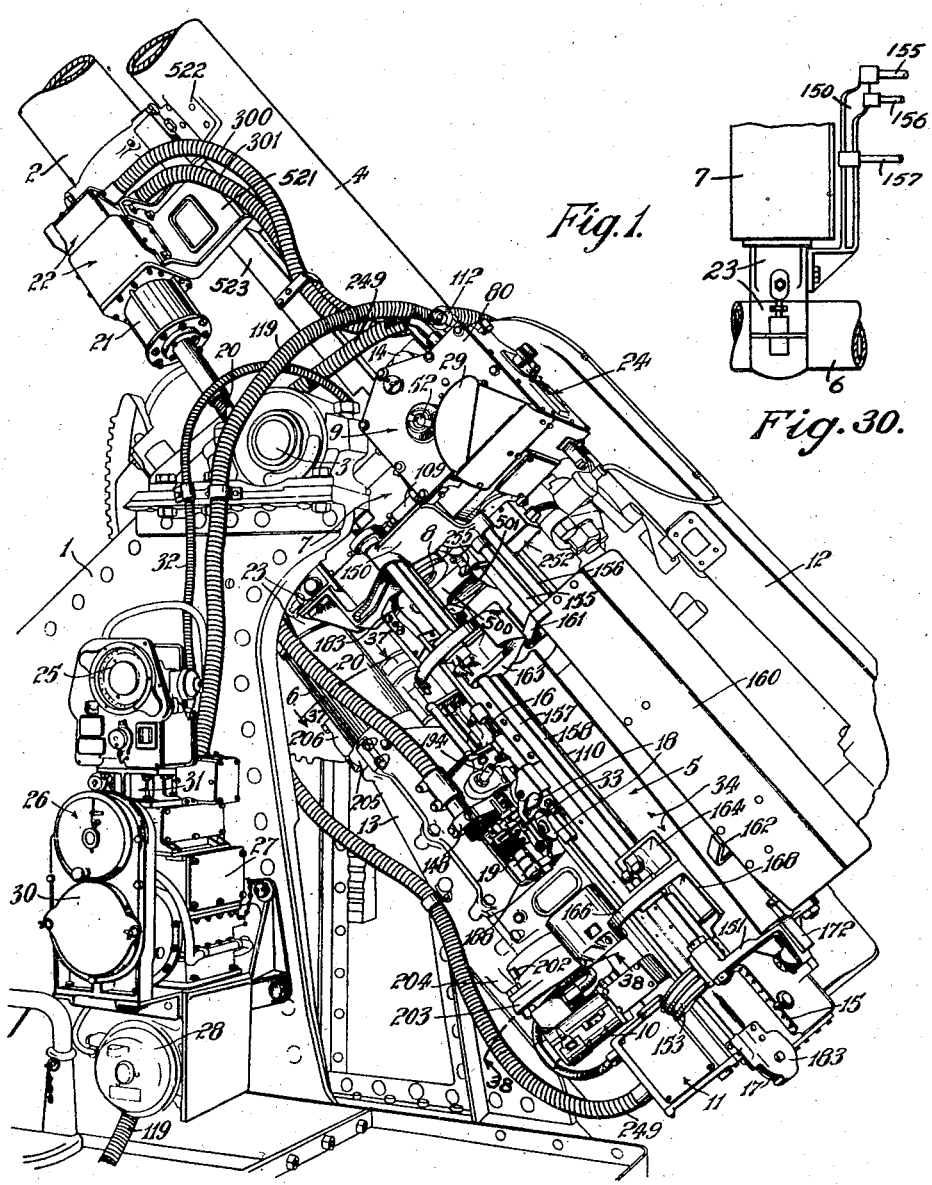
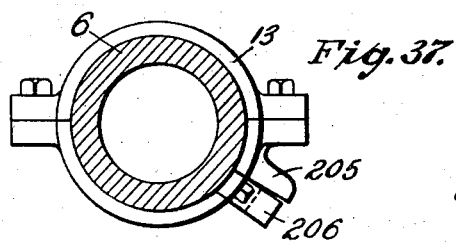

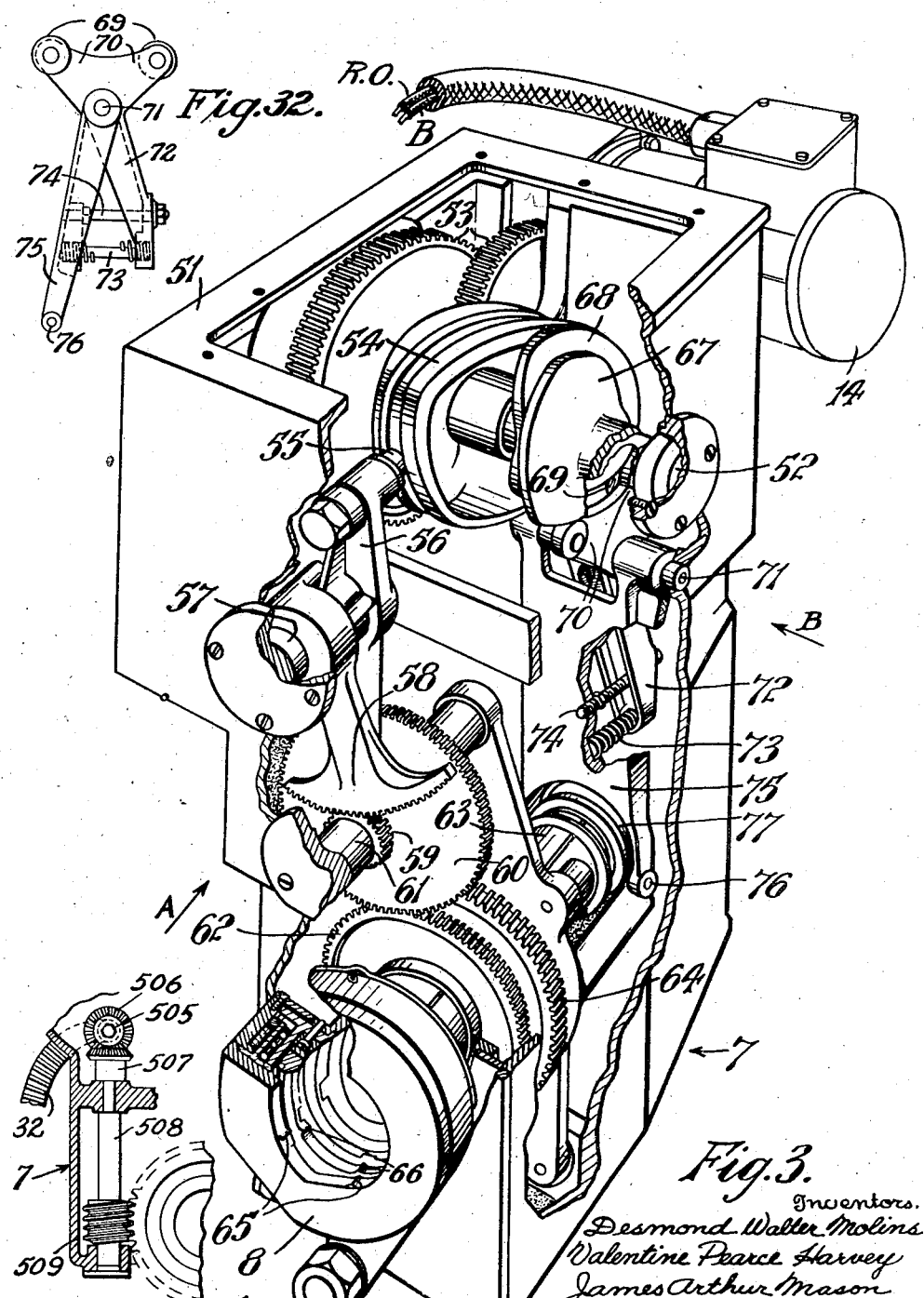

April 6, 1948.                D. W. MOLINS ET AL                2,439,142
             LOADING AND FIRING MECHANISM FOR QUICK-FIRING GUNS
                     Filed May 25, 1943         19 Sheets—Sheet 4
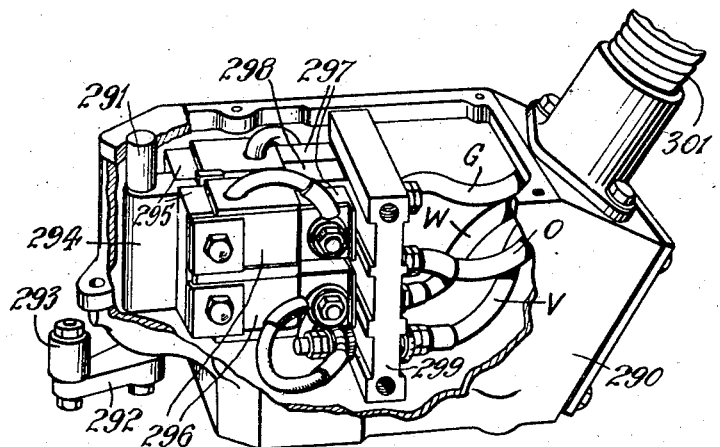
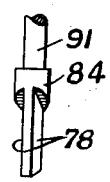
Fig. 33.
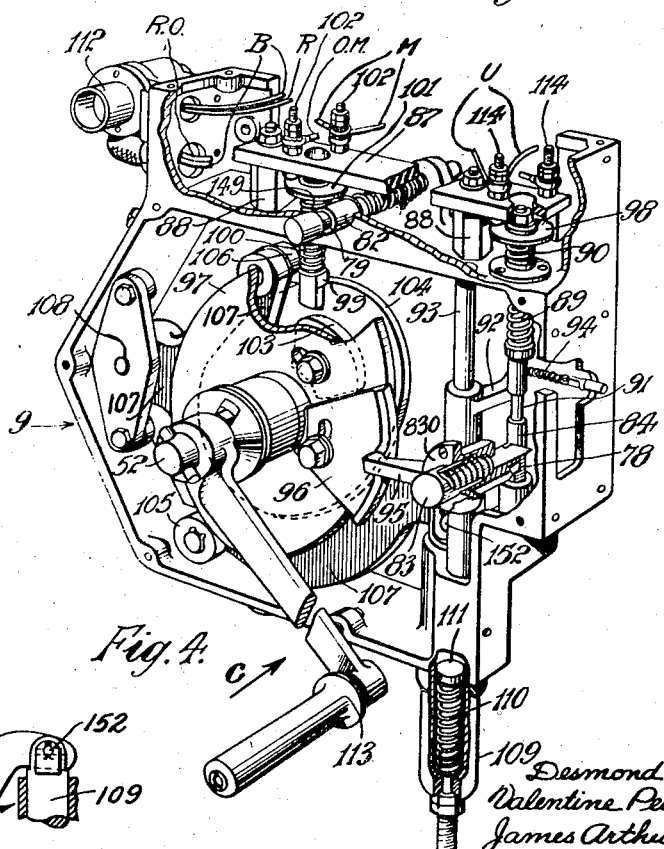
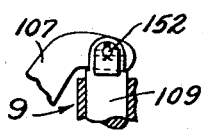
Fig. 34.
Inventors
Desmond Walter Molins
Valentine Pearce Harvey
James Arthur Mason
Gordon Francis Wellington Powell
By Loyd Hall Sutton
        Attorney

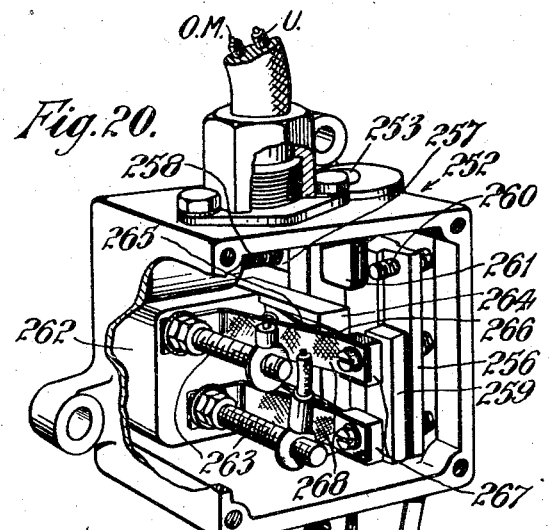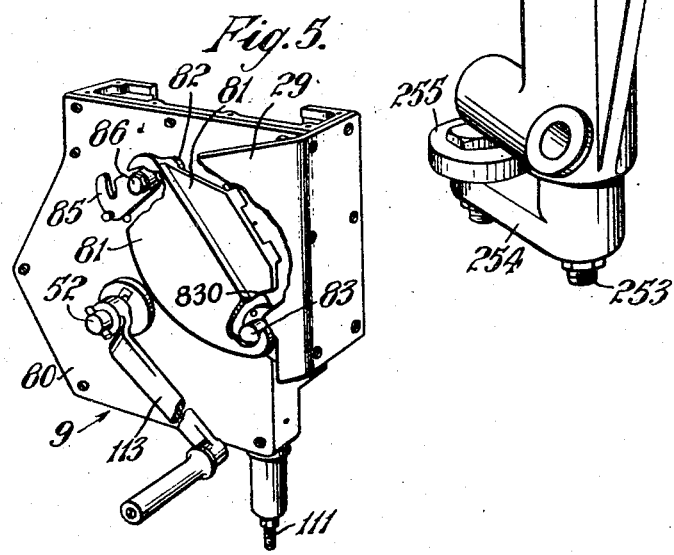

Inventors
Desmond Walter Molins.
Valentine Pearce Harvey.
James Arthur Mason.
Gordon Francis Wellington Powell
By Loyd Hall Sutton
Attorney

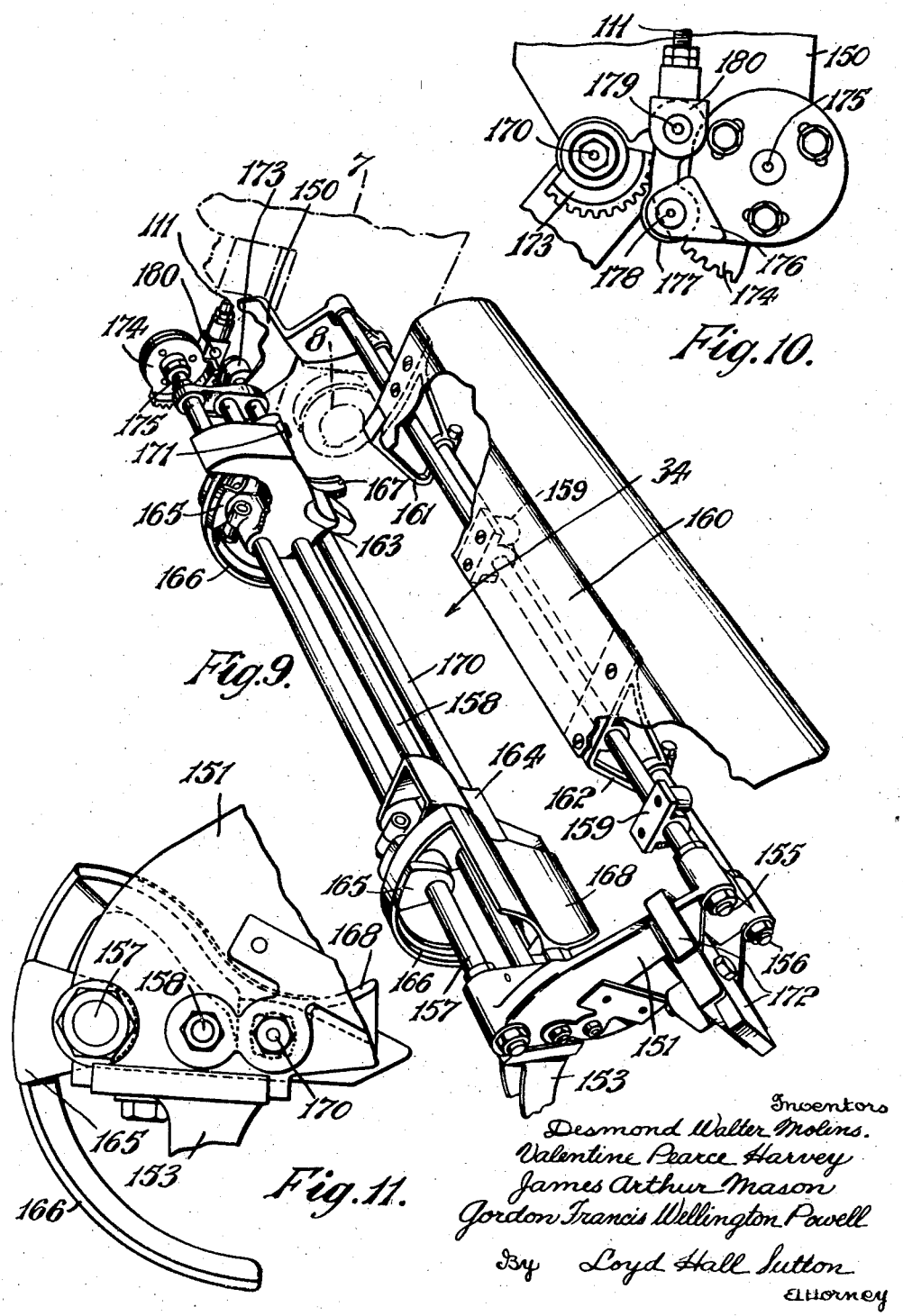

April 6, 1948.                D. W. MOLINS ET AL                2,439,142
          LOADING AND FIRING MECHANISM FOR QUICK-FIRING GUNS
                Filed May 25, 1943            19 Sheets-Sheet 8
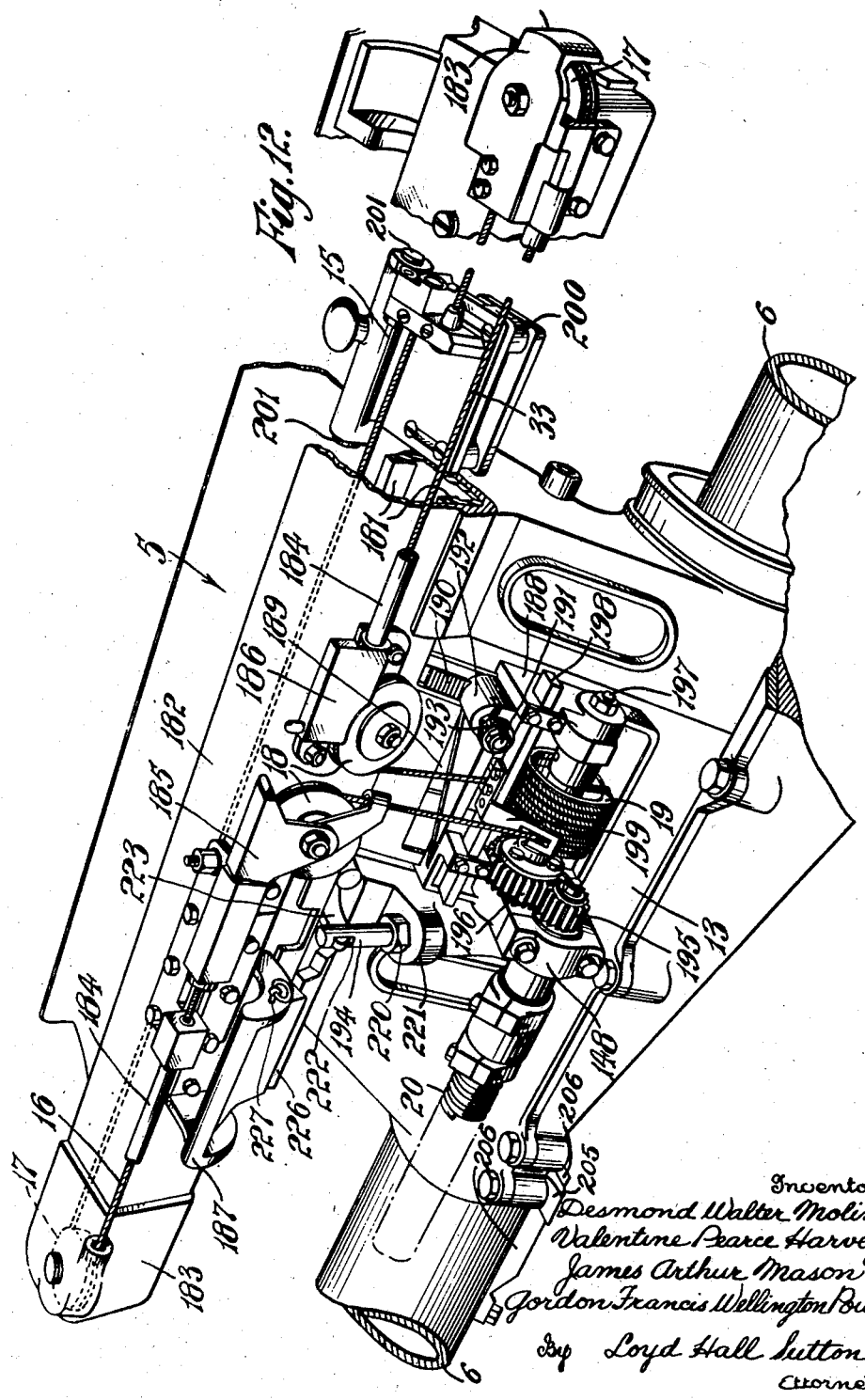

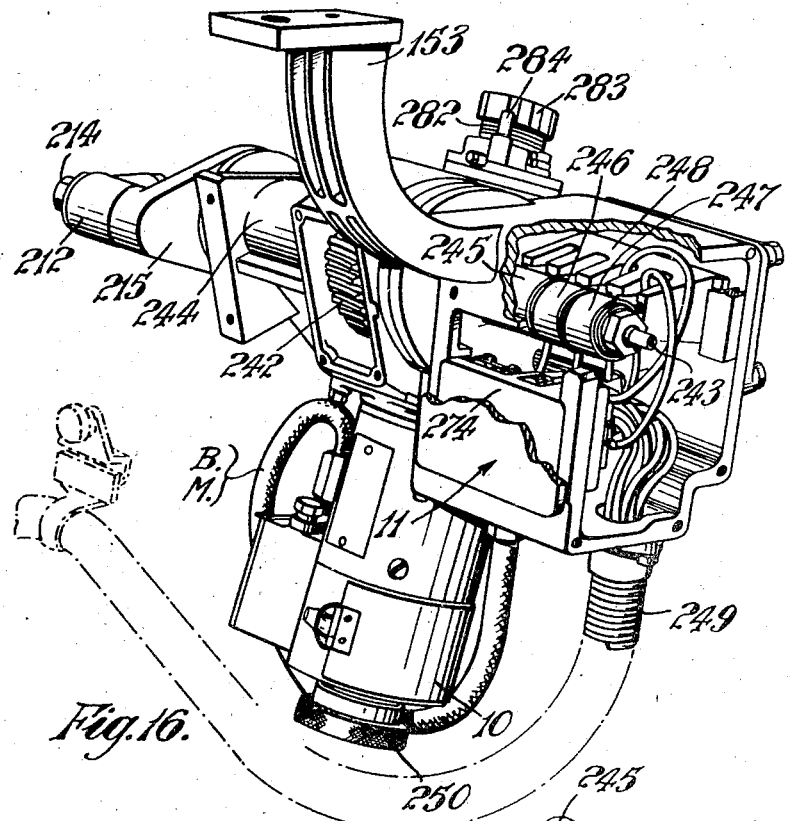
Fig. 16.
Fig. 17.
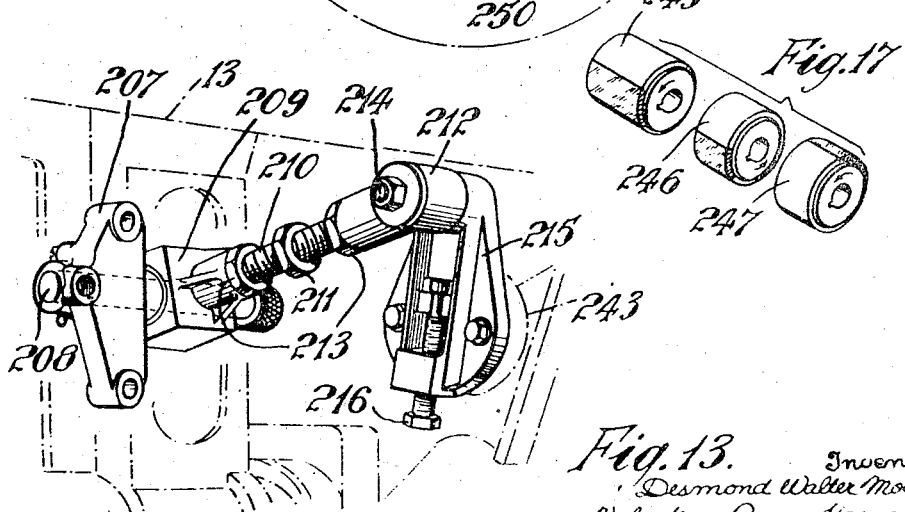
Fig. 13.
Inventors
Desmond Walter Molins.
Valentine Pearce Harvey.
James Arthur Mason.
Gordon Francis Wellington Powell
By Loyd Hall Sutton.
Attorney Inventors
Desmond Walter Molins.
Valentine Pearce Harvey.
James Arthur Mason.
Gordon Francis Wellington Powell
By Loyd Hall Sutton
Attorney

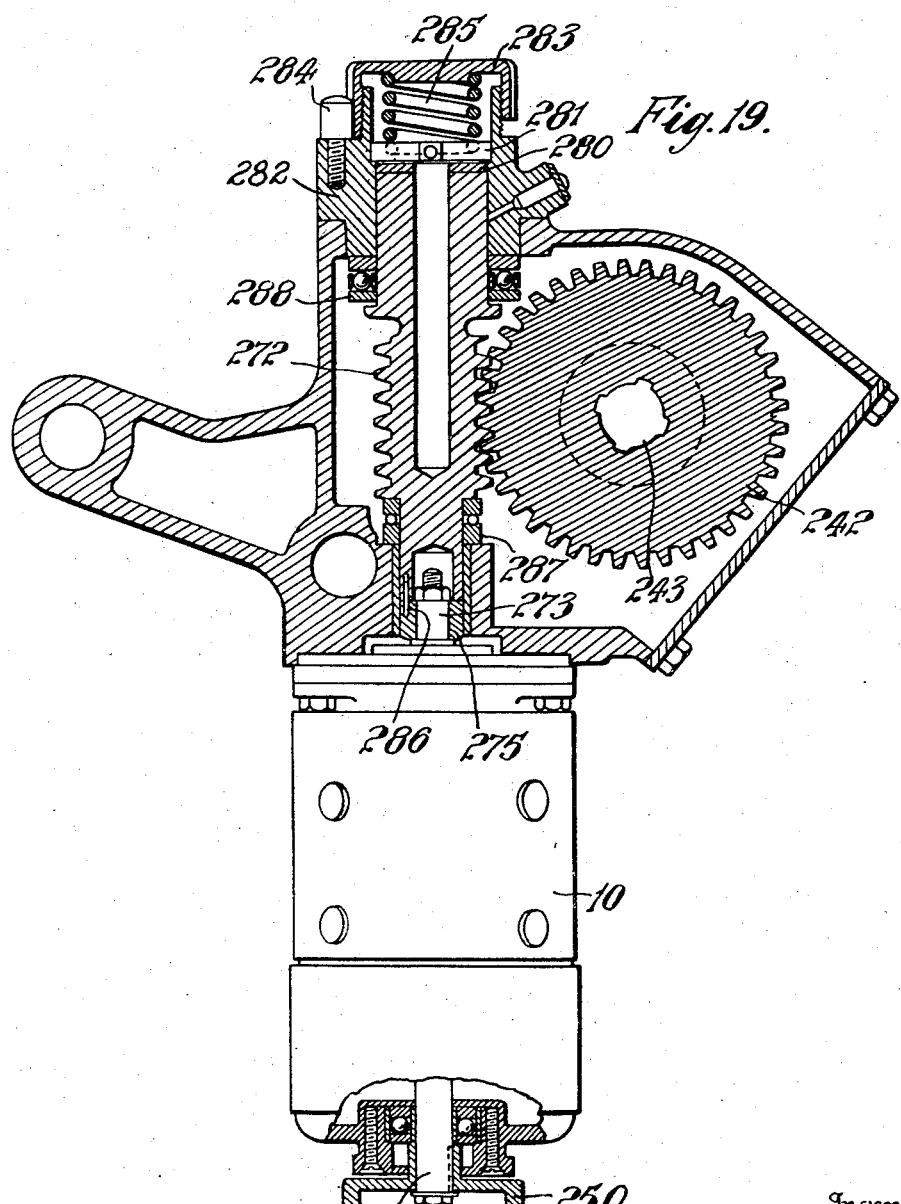

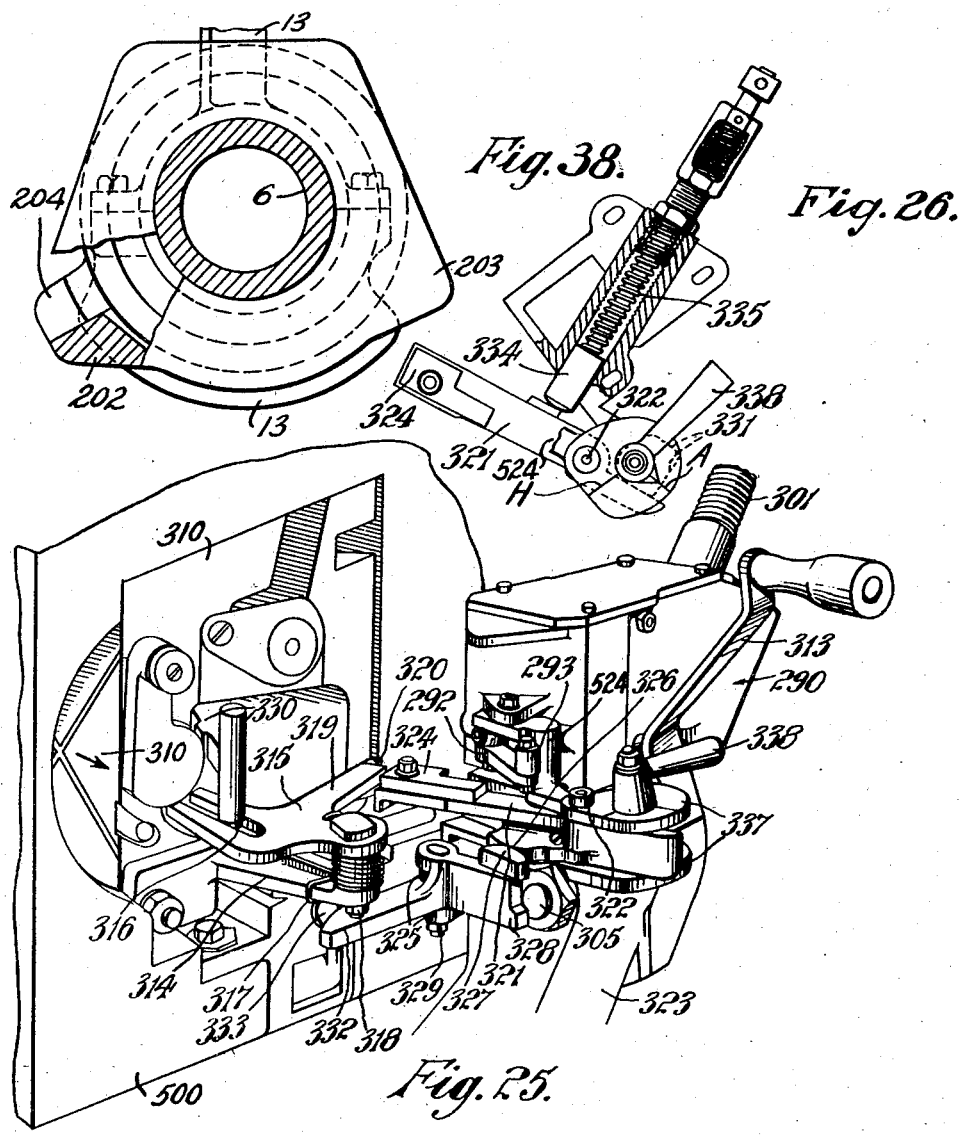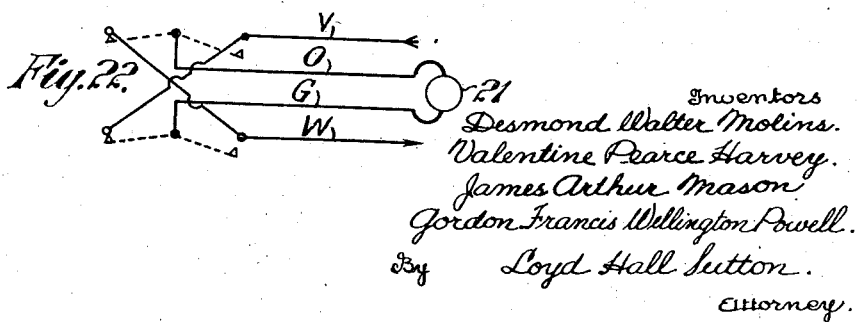

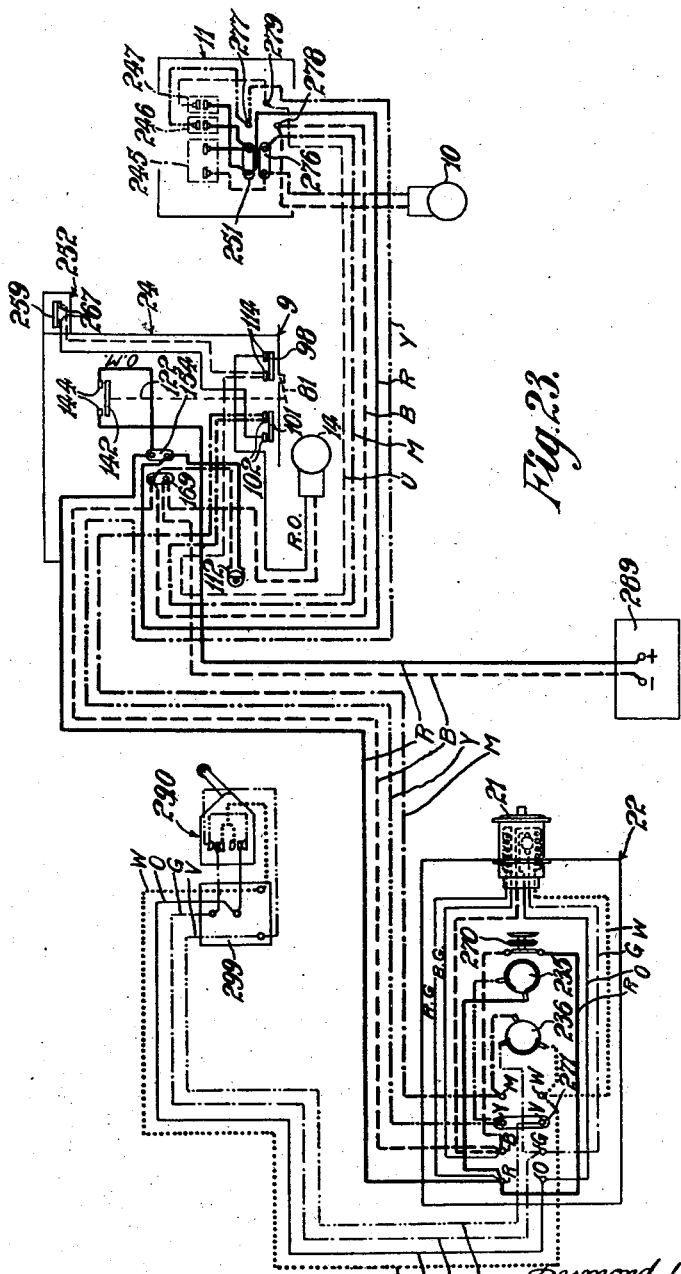

April 6, 1948.  D. W. MOLINS ET AL  2,439,142
LOADING AND FIRING MECHANISM FOR QUICK-FIRING GUNS
Filed May 25, 1943  19 Sheets-Sheet 15
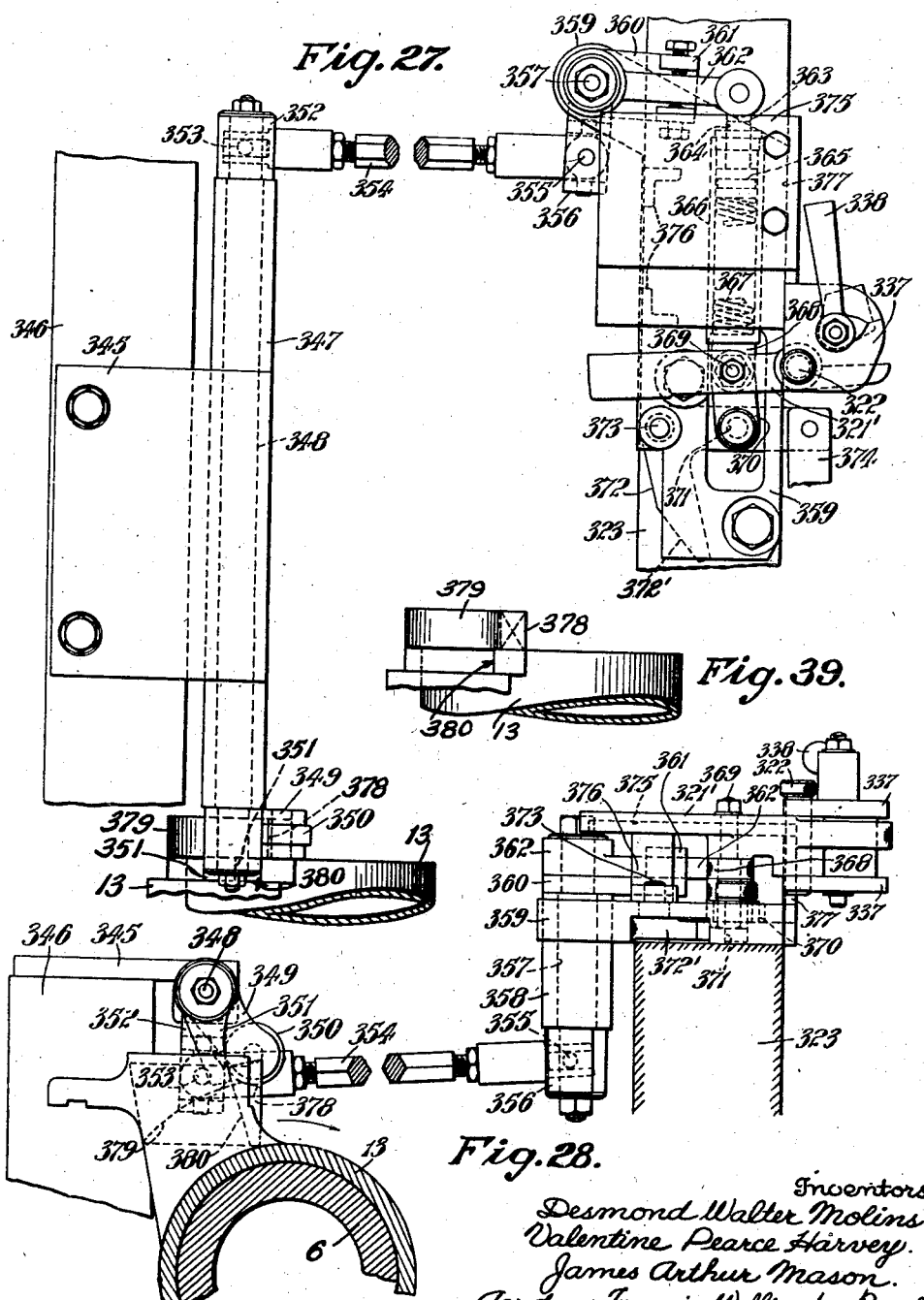

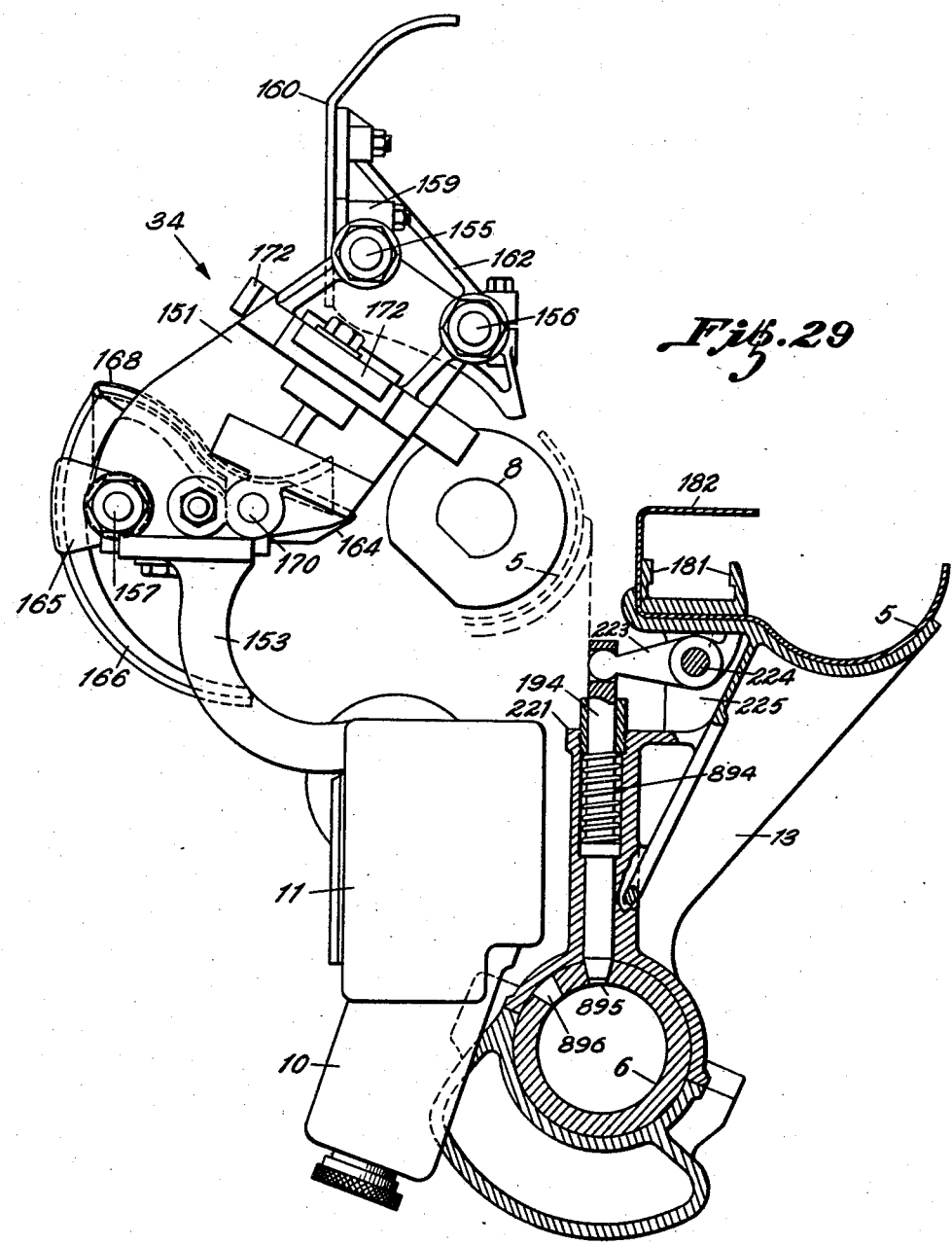

April 6, 1948.    D. W. MOLINS ET AL    2,439,142
LOADING AND FIRING MECHANISM FOR QUICK-FIRING GUNS
Filed May 25, 1943    19 Sheets-Sheet 18

INVENTORS
Desmond Walter Molins
Valentine Pearce Harvey
James Arthur Mason
Gordon Francis Wellington Powell
By Loyd Hall Sutton attorney

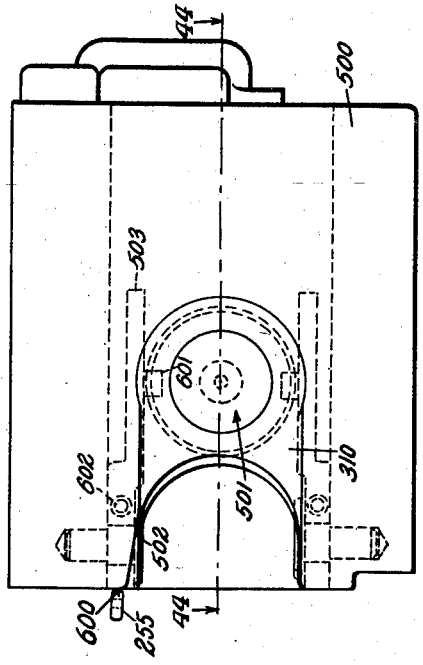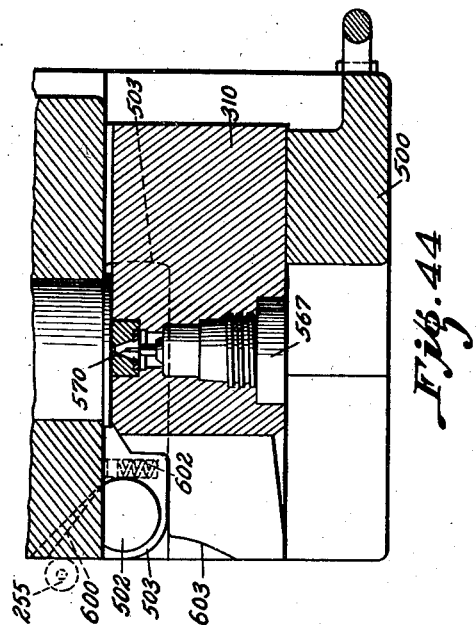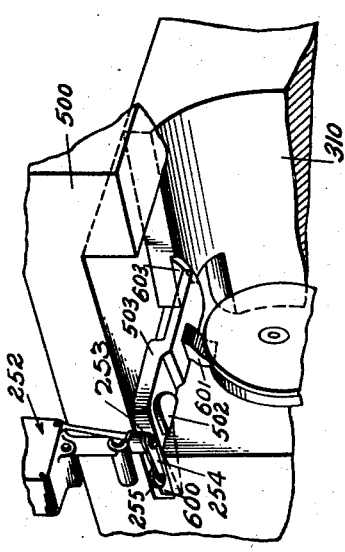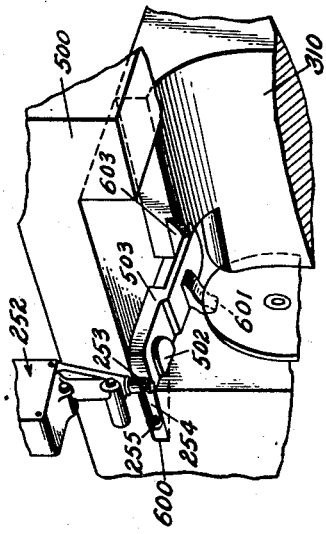

Patented Apr. 6, 1948

2,439,142

UNITED STATES PATENT OFFICE 2,439,142

LOADING AND FIRING MECHANISM FOR QUICK-FIRING GUNS

Desmond Walter Molins, Valentine Pearce Harvey, James Arthur Mason, and Gordon Francis Wellington Powell, Deptford, London, England, assignors to Molins Machine Company Limited, Deptford, London, England Application May 25, 1943, Serial No. 488,453
In Great Britain April 13, 1942

35 Claims. (Cl. 89—1)

This invention concerns improvements in or relating to ordnance (hereinafter called a gun) of the quick-firing kind which is provided with a loading tray movable between a position in front of the breech (hereinafter called the "loading position") to a firing position in which the tray is off-set from the breech so that it is out of the way of the breech during recoil, and wherein the breech-block is capable of closing automatically on insertion of a round into the breech. Such a gun is referred to hereinafter as "a gun of the kind described."

In quick firing guns of the kind described for use against aircraft, it has been the practice to place a round in the loading tray, then to swing the latter by hand so as to bring the round into alignment with the breech, ram the round into the breech (which latter can be set to close automatically on insertion of the round when the tray is returned), and then manually to return the tray, close the breech and fire the gun after the breech is closed. Where the rounds are fuzed, it has previously been the practice to set the fuze before placing the round into the loading tray.

A difficulty experienced with quick-firing guns of the kind described has been in the length of time and the variation of time between the setting of the fuze and the firing of the round. Where the fuze-setting, tray swinging, ramming and firing or some of them are effected manually, there is invariably a time lag due to the human element, which time lag will, incidentally, vary according to the efficiency of a given crew, and will thus vary from crew to crew and may even vary with different members of a given crew. Thus the total time between the completion of the setting of the fuze and the firing of the round may vary and is, in fact, known to vary in practice between approximately 4 to 8 seconds on a 3.7" anti-aircraft gun of the kind described. Thus it will be seen that it is difficult in the extreme to make any accurate correction for this time variation, and even where a fixed time, say 6 seconds, can be relied upon, the length of time, namely six seconds, is so great as to make effective allowance most difficult. Consequently it has been the practice to set the fuze by an amount which it is estimated will turn up in several seconds time, to load the round so set into the gun and then wait before firing until that fuze has come up on the fuze receiver or predictor dial as the case may be; in other words there is a wait until "the fuze is ripe." At this instant a signal is given and the gun is fired. Even with this method the human element comes into it, in that there is some delay between the signal to fire being given and the reaction of the man who is to operate the firing lever. In addition to the foregoing there is sometimes a further difficulty in that due to the long wait between the setting of the fuze and the proposed firing time, the estimated or anticipated fuze does not "become ripe," in which case the round has to be fired or the round unloaded with consequent further delays. The whole system is generally unsatisfactory for use against such fast moving targets as modern aircraft. In any case, this method of firing is slow and it is an object of the invention both to reduce these difficulties and to increase the accuracy and the rate of firing in guns of the kind described by effecting substantial reduction of the "dead time" and by making this reduced time constant or as nearly constant as practicable.

It has already been proposed in co-pending United States patent application Serial No. 466,808 filed November 24, 1942, to mount a fuze-setter on the gun so that it can set the fuze of a round placed in the loading tray. This arrangement enables a given crew to work to a more constant dead time since after setting, the further movements start immediately with the swinging of the loading tray. Prior to this it was necessary to remove the round from the setter and place it in the loading tray. Thus the proposal in co-pending United States application Serial No. 466,808 does cut out a source of delay and irregularity.

According to the present invention there is provided a gun of the kind described wherein the breech is adapted and arranged to close automatically on the insertion of a round into the breech, comprising fuze-setting means adapted to set the fuze of a round in the loading tray, automatic actuating means to actuate the fuze-setting means and the loading tray in timed relationship so that the fuze of the round is already set when the tray is in the loading position, a rammer-device operably controlled in timed relationship with the movement of the loading tray automatically to ram the round into the breech, and means associated with the breech to fire the round automatically when the breech is closed, whereby there is provided an automatic setting-loading-firing cycle giving a substantially constant dead-time for each round.

Further according to the present invention there is provided a gun of the kind described having a cocking-lever which is adapted to cock a firing pin and which is adapted to be moved to a firing position, i. e. clear of the firing pin, after the breech is closed, and comprising a fuze-setter having fuze-setting elements, supporting-means (e. g. the loading tray) to receive and support a round for fuze-setting on the gun, the parts being arranged to effect relative movement between the fuze-setting elements and a round lengthwise of the latter to cause the former to engage and set a movable fuze-element of the round in said supporting-means, and thereafter to effect relative movement between the setting elements and the fuze-element away from one another, actuating means operably controlled in timed relationship with the operation of the fuze-setter to move the round into substantial alignment with the breech (e. g. to swing the loading tray from the firing-position into the loading position) after the round is clear of the fuze-setting elements, and a rammer-device operably controlled in timed relationship with the actuating means to ram a round into the breech, wherein the breech-block is adapted to close automatically on the insertion of a round and wherein the tray is automatically returned to the firing positing after a round has been rammed, and means operably controlled by the movement of the tray to the firing position and by the closing of the breech or by either of them automatically to actuate the firing mechanism only when the cocking lever is in the firing position.

A gun according to this invention may also comprise a main switch, electric motors for driving the fuze-setter, the tray and the rammer respectively, circuits for said motors, and means for controlling said circuits whereby the motors are controlled and brought into operation in the desired sequence and at the correct time after the first motor is started by the main-switch, said means for controlling said circuits comprising contact timing devices (e. g. rotary and cam-operated switches), driven in timed relationship with the shafts of said motors. The said main switch may be so arranged that actuation thereof after one fuze-setting cycle of a complete setting-loading-firing cycle is completed, causes a new setting-loading-firing cycle to be commenced when the tray has returned to the firing position from the preceding setting-loading-firing cycle and thereby to overlap said preceding cycle. The said main switch may include a time-control device whereby the switch can be automatically broken after a predetermined time to prevent damage to the motors and wastage of current.

A round-receiving device or receiver may be provided for receiving rounds and so located that it can supply a round to the loading tray when the latter is in the firing position, wherein means under the control of the said main-switch is provided for effecting delivery of a round to the loading tray, the said main-switch being so arranged that it can cause said means to be operated only when the loading tray has returned to the firing position.

The means to actuate the firing mechanism may include a pressure-device which comprises an intermediate member which is operably connected to the cocking lever and through which the pressure-device operates on the firing plunger, whereby the intermediate member prevents actuation of the firing plunger by said pressure-device until the cocking lever is in the firing position. The means to actuate the firing mechanism may comprise a spring adapted to be loaded by the breech-block during run-out and to be released by the movement of the breech-block as the latter completes its closing movement. Alternatively, the said means to actuate the firing mechanism may comprise a yielding pressure-device (e. g. a spring-loaded arm) which is adapted to be operated by the tray when it reaches the firing position, and cam surfaces on the loading tray may be arranged to engage levers which are linked to a member adapted to operate the yielding pressure-device when the tray has moved away from the loading position and the levers are operated by said cam-surfaces.

The rammer-device may be operated by an electrical motor and the current to the motor on the ramming stroke may be cut off by a breech-switch adapted to be broken by the breech-mechanism only when the breech-block has occupied a position behind the round to prevent the latter from coming out of the breech. The said breech-switch may be operably connected with the breech-mechanism, whereby the rammer-motor-circuit can be energized to effect a ramming stroke only if the breech is open. The said breech-switch may comprise a change-over switch which is adapted and arranged to reverse the rammer-motor-circuit to withdraw the rammer when the breech has moved over enough to prevent the round coming out of the breech.

The tray-actuating means may comprise an electrical motor and a crank coupling the motor to the tray, whereby movements of the crank cause reciprocation of the tray, and wherein means is provided to stop the motor at the end of each stroke of the crank and tray. The tray may be arranged to be moved against a limiting stop, and a resilient, adjustable link may be provided between the crank and the loading tray.

A switch (for example the said breech-switch specified above) may be provided to effect control over the tray-driving motor and its circuit for the tray-return movement and in such case is so arranged that the tray-motor-circuit cannot be energized to cause the tray-motor to move the tray from the loading position until the breech-block has occupied a position behind the round to prevent the latter from coming out of the breech. The said switch may comprise a change-over switch which prevents the energizing of the tray motor to move the loading tray from the firing position to the loading position until the breech is opened, said switch being operated by part of the breech-mechanism so that the switch is closed and the tray-motor thereby started only if the breech is open.

The rammer-device may comprise pulleys and a cable passing thereover and attached to the rammer and means may be provided for adjusting the position of one of the pulleys to enable the tension of the cable to be maintained.

A 3.7 inch anti-aircraft gun equipped with the devices made in accordance with the present invention will now be described by way of example with reference to the accompanying drawings in which:

Figure 1 is a perspective view of part of an anti-aircraft gun showing the application of the invention thereto.

Figure 2 is an elevation, partly in section, of an oil unit and gearing connected therewith to adapt it for use with the present invention.

Figure 3 is a perspective view partly broken away showing the main features of the fuze-setting apparatus.

Figure 4 is a perspective view, partly broken away, of a casing which is attached to the fuze-setting apparatus containing mechanism for operating various parts of the devices made in accordance with the invention, said mechanism itself being driven from the fuze-setter.

Figure 5 shows the exterior of the casing shown in Figure 4 and illustrates other details of the device.

Figure 9 is a perspective view of a round-receiving device for feeding rounds to the loading tray.

Figure 10 is a view of part of one end of Figure 9 showing operating mechanism.

Figure 11 is a view of part of the other end of Figure 9 from that shown in Figure 10.

Figure 12 is a perspective view (shown broken) of the loading tray and rammer and the driving arrangement thereof.

Figure 13 shows a driving crank for the loading tray and other details.

Figure 14 is a fragmentary view of Figure 12 taken from a different angle and showing details of a tray locking device.

Figure 17 is a perspective view of three timing drums contained in the box attached to the tray motor.

Figure 18 is a diagram showing brush gear for the timing drums of Figure 17 and a terminal block contained within the box attached to the tray motor.

Figure 19 is an elevation partly in section, of the tray motor and its gearing.

Figure 20 is a perspective view, partly broken away, of a casing containing an electric switch (the tray motor interlocking switch) and operating devices therefor.

Figure 21 is a perspective view, partly broken away, of a casing containing an electric switch (the breech interlocking and rammer reversing switch) and operating devices therefor.

Figure 22 is a key diagram of the connections of the switch shown in Figure 21.

Figure 23 is a diagram of the electric circuit connecting the various units of the apparatus.

Figure 25 is a perspective view of part of Figure 24 to a larger scale, the breech-block being in the closed position.

Figure 26 is a plan of part of Figure 25, partly in section.

Figure 27 is a plan view showing modifications to the firing mechanism.

Figure 28 is an elevation of Figure 27 and also shows part of a rocking bracket for the loading tray.

Figure 29 is a sectional view showing the relative positions of the round-receiver and the loading tray.

Figure 30 is a front elevation of a small part of Figure 1 showing supporting brackets for the fuze-setter and round-receiver.

Figure 31 is a section of part of the fuze-setter shown in Figure 3, the view being taken in the direction of the arrow A in the latter figure.

Figure 32 is a fragmentary view of the fuze-setter taken in the direction of the arrow B in Figure 3, and showing a cam lever.

Figure 33 is a perspective view of a detail of Figure 4.

Figure 34 is a fragmentary view taken in the direction of the arrow C in Figure 4, and showing a cam lever pivot.

Figure 37 is a cross section taken on the line 37—37 in Figure 1 showing a loading tray stop.

Figure 38 is a cross section taken on the line 38—38 in Figure 1 showing another loading tray stop, the view being broken away.

Figure 39 is a view of part of Figure 27.

Figure 40A is a fragmentary perspective view looking up into the interior of the breech, showing a round nearly rammed home and the breech-block held open by a retaining catch.

Figure 40B is a perspective view similar to Figure 40A, but showing the round rammed home and the retaining catch moved so as to permit the breech-block to close, the latter being shown in a partially closed position where it just masks the end of the round.

Figure 41 is a perspective view showing a diagrammatic arrangement of certain elements of the breech mechanism illustrated in Figures 24–26, the outline of the breech-block being shown in chain lines.

Figure 42 is a sectional view through the breech-block with certain parts shown in full, showing the firing pin and associated parts.

Figure 43 is an elevation of the breech end of the gun showing the breech-block in closed position and indicating the positions of the breech-retaining catches.

Figure 44 is a sectional view, with certain parts shown in full, taken on line 44—44 in Figure 43.

Figure 7:
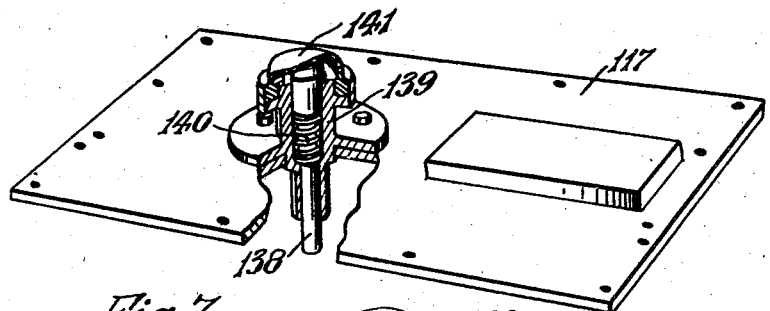
Figure 7 is a perspective view of the lid of the casing shown in Figure 6 illustrating further parts.

The invention will be generally described with reference to Figure 1, and thereafter each unit in turn will be described more fully. Like references refer to similar parts throughout the several figures of the drawings, and the more important visible features of the units may be identified in Figure 1 by the same references.

General construction

In Figure 1 there is shown a gun mounting 1 and a portion of the gun barrel 2 arranged to swing about trunnions 3, and part of the recoil barrel 4. As far as possible the common features of the gun are shown in relatively faint lines while the new features or those modified in accordance with the invention are shown in heavier lines. The loading tray 5 is constructed in the manner customary on this type of gun and is attached to a rocking bracket 13 arranged to swing on a cylindrical member 6 (see Figures 1, 12 and 29), which forms part of the counterweight system of the gun, about an axis parallel to the axis of the barrel 2. A fuze-setter 7 is rigidly attached to the cylindrical member 6 by a curved clamp bracket 23 (see also Figure 30) and supported at the top by another bracket (not shown) which is fixed to the counterweight beam 12. The fuze-setter comprises a moving head 8, having fuze-setting elements, which is arranged, on the pressing of a lever 81 hinged on a starting box 9 (Figures 1 and 5) but hidden in Figure 1 beneath a safety cover plate 29, to complete a cycle of operations which comprises moving over the nose of a round in the loading tray, setting the fuze and withdrawing again. In an earlier construction, described in United States application Serial No. 466,808, filed November 24, 1942, after this cycle of operations, the loading tray 5 was swung over to the loading position by means of a handle. In the present case, however, the loading tray is arranged to be actuated automatically and for this purpose there is provided an electric motor 10 which operates, as will be described in detail later, through a reduction-gear and a crank 215 (Figure 13) connected to the loading tray by a link 210 so that the tray is automatically swung first in one direction and then returned. Half a revolution of the crank moves the tray in one direction and the other half returns the tray. A box 11 attached to the tray-motor contains three contact timing drums. The fuze-setter 7 is driven by an electric motor 14.

The rammer 15 is operated for ramming by a wire-cable 16 and for the return stroke by a wire-cable 33 (Figures 1 and 12). The cables pass round pulleys 17 at the two ends of the tray and over pulleys 18 at the side of the tray. The wire-cables also pass round a helically grooved drum 19. In order to compensate for possible stretching of the cables, the drum 19 is mounted on a vertically adjustable slide, described later, so as to permit slack to be taken up. This drum is driven by a flexible shaft 20 which is driven by an electric motor, the rammer-motor 21, through a reduction-gear. Means for enabling the rammer to be manually operated is described later.

Attached to the motor 21 is a box 22 containing two contact timing drums. The rammer motor is fixed by means of brackets 521 and 522 which are both fixed to the box 22 and respectively to part of the gun cradle marked 523 and to the recoil barrel 4, see Figure 1.

A box 24 containing a main switch and associated parts is fixed to the starting box 9 and located on top of the fuze-setting machine to which it is also fixed.

In Figure 1 is also shown the usual predictor receiver 25 with a follow-the-pointer hand-wheel 26 for setting the worm-wheel which carries the control-member in the fuze-setter, and in addition there is shown an existing form of oil-unit 27 for remote-control fuze-setting which can be used instead of the hand-wheel 26 as will be explained later. The oil-unit is driven by an electric motor 28 which receives power from a source of supply other than the battery which supplies the electric motors appertaining to the invention, for example, the motor 28 is driven from the local mains. In a casing 30 at the front of the unit there is arranged certain gearing, described later, for adapting the unit for use with the invention, and transmission or intermediate gearing is also provided in the casing 31. A flexible shaft 32 transmits the movements from the gearing in the casing 31 to the fuze-setter.

A round-receiving device (hereinafter called the "round receiver" or "receiver") 34 comprising round supporting devices is fixedly mounted to the breech end of the gun by means of suitable brackets. The construction of the round receiver cannot be followed easily from Figure 1, so a fuller description is deferred.

*Oil unit, predictor-receiver and fuze-reading transmitting gear*

The general arrangement of this apparatus is shown in Figure 1, and as previously stated the oil unit 27 and a predictor-receiver 25 are of any desired construction. The oil-unit and the predictor-receiver shown are those used, for example, on British Ordnance Q. F. 3.7 inch Mark II.. The purpose of these devices is to enable a gun to be controlled from a distance so that from a predictor reading the gun can be automatically trained on its target and the fuze-setter adjusted as necessary for the particular fuze to be set.

It is necessary, however, that means should be provided for adjusting the fuze-setter at the gun position when the remote control apparatus is not being used, and this necessitates a certain amount of modification including the intermediate gearing in the casing 31 previously referred to, to adapt the known apparatus for use with the present invention.

When the gun is being trained by remote control from a predictor with a fuze-lead instrument the electric motor 28 is operating, and this drives the oil unit as previously mentioned whereby the impulses received from the predictor are translated into a movement of a driving shaft of the oil unit from which, among other things, the regulation of the fuze-setter is derived. When the gun is working in this fashion the predictor-receiver 25 is not in use although the dial of said predictor-receiver is rotating in accordance with the change of the fuze, but as the gun is being worked automatically it is unnecessary to watch the follower-pointer.

When the remote control devices are not used the predictor receiver dial derives its movements direct from the predictor, and it is then necessary for a man to operate the follower-pointer to regulate the control member of the fuze-setter as may be necessary. The electrical connections from predictor to oil unit are changed as necessary to go direct to the receiver in this case.

Referring to Figure 2, the driving shaft 35 of the oil unit 27 protrudes into the gear casing 30 and has fixed thereto a gear-wheel 36 which can be changed if necessary for other gears having different numbers of teeth to allow a fuze factor to be included when operating through the oil unit. The gear-wheel 36 engages with an idler gear-wheel 37 rotatable on a pin 38 which is fixed to a quadrant 39, the quadrant being pivoted on the axis of the main shaft 40 of the intermediate gearing and clamped in position when the gears are properly meshed. The shaft 40 carries a gear-wheel 44 meshing with the idler gear wheel 37 and is fitted on the exterior of the gear casing with the hand wheel 26. This hand-wheel may be coupled to the shaft by means of a screw 41 which can be moved radially of the wheel by a nut 42 so that a pin 43 on the end of the screw may operatively engage with a hole in the shaft, or be removed therefrom as necessary. When the gun is being worked by remote control the pin 43 is withdrawn from the shaft and the hand-wheel remains still. But when the predictor receiver is to be operated so that the pointer follows the dial, the pin 43 is moved into the hole in the shaft, and on turning the wheel the predictor-receiver pointer is moved round. The oil unit embodies a clutch 504 whereby the end of the shaft 35 which carries the gear-wheel 36 may be declutched from the rest of the oil unit mechanism when the hand-wheel 26 is in use.

The shaft 40 has a worm 45 fixed thereon which engages with a worm-wheel 46 fixed to the end of a vertical shaft 47 rotatably mounted in the casing 31 of the intermediate gear. This shaft drives the follower-pointer of the receiver. Near the end of the shaft 40 there is fixed a bevel gear wheel 48 which engages with a similar bevel gear wheel 49 mounted on another vertical shaft 50 which is journalled in the intermediate gear casing 31. To this latter shaft there is attached the end of the flexible shaft 32 which extends up to the fuze-setting machine 7 and is coupled at its other end to a shaft 505 (Figure 31) of the fuze-setter furnished with a bevel gear-wheel 506 engaging another bevel gear-wheel 507 attached to the shaft 508 of the worm 509 which engages the worm-wheel 64 of the fuze-setter. Thus when the hand-wheel 26 is turned, the fuze-setter is adjusted in accordance with the movements of the follower-pointer of the predictor receiver.

Fuze-setter

The fuze-setting apparatus 7 is shown in Figure 3 and its main features will be briefly described, but for a full description of the machine in all its details, reference should be made to United States application Serial No. 466,808.

The mechanism is housed in a casing 51 and at the upper part a cam-shaft 52 is journalled in bearings formed in the casing, the cam-shaft being driven by the electric motor 14 through the gearing 53 shown. On the cam-shaft there is mounted a grooved drum cam 54 in which a roller 55 fixed at the end of one arm 56 of a double-armed lever pivoted on a stud 57 engages. The other arm of the lever comprises a toothed quadrant 58 which engages with a toothed pinion 59 fixed to a large gear-wheel 60, the two gears being mounted for rotation on a shaft 61. The gear-wheel 60 engages a further gear-wheel 62 which is concentrically mounted on the hollow shaft 63 of the fuze-setting head 8 of the apparatus. The hollow shaft 63 is mounted for rotation and reciprocation in the casing 51. As the drum cam 54 makes one revolution, the head of the setter is rotated first in one direction and then in the opposite direction, but the degree of rotation is controlled by the mechanism described in the prior application referred to, so that the necessary fuze-setting for any particular round is determined. The head of the fuze-setter is provided with fixed knives 65 and moving knives 66 which parts may be changed when it is desired to set other kinds of fuzes.

The cam-shaft has two further cams 67 and 68 fixed thereon, and these engage with rollers 69, on two arms 70 of a three-armed lever, see also Figure 32, pivoted in the casing at 71. The lower arm 72 of the lever is coupled by means of a spring 73 and stud 74 to a lever 75 also pivoted on the spindle 71. The spring and stud connection is to allow for variations in the lengths of rounds as described more fully in the prior application referred to. The lever 75 is forked at its free end and provided with pins 76 which engage in a circumferential groove 77 in the hollow shaft 63 of the fuze-setter head so that as the cam-shaft rotates the head is reciprocated to and fro in the manner described in detail in the prior application referred to.

Starting box

Referring to Figure 5, the cover 80 of the starting box 9 (Figure 1) has hinged thereto a plate shaped lever 81 which acts as the striker or lever of two switches, viz: a main switch and a fuze-setter motor switch. The cover plate 29 is provided to prevent accidental operation of the lever 81.

Referring now to Figure 4, when the lever 81 is pressed inwards by hand, it forces in a spring loaded plunger 82, which operates the main switch of the electric circuit, and a further spring loaded plunger 83 mounted in a bush 830 screwed to the front of the casing 9. Further description of the main switch and its operation by the plunger 82 will be deferred until later when the main switch box 24 is being described.

The movement of the second spring loaded plunger 83 causes a contact spindle 84, Figure 4, to be raised owing to the fact that the plunger is bevelled at the end which engages said spindle. The spindle has two flats 78 on it, indicated by shading, and shown more clearly in Figure 33, and these are cut in the spindle so that the upper ends of the flat portions are arranged at a angle corresponding to the bevels on the plunger end which is forked to embrace the flattened portion of the spindle. The upward movement of the contact spindle sets the fuze-setter motor in action, the remaining details of the switch contacts being described below.

A hook-shaped latch 85, Figure 5, is pivoted at 86 on the cover 80 to hold the plunger 82 in the out position by engaging in a groove 79 in said plunger (see Figure 4), thereby preventing the switch striker from being accidentally forced in when the gun is not in use, for example, in transit or if hand firing is resorted to.

Referring again to Figure 4; the fuze-setter contact spindle 84 previously referred to has, at its upper end, a contact disc 98 which engages with a pair of contact studs 114, the studs being fixed on to an insulating block 87 which is fixed on pillars 88 as shown in the figure. A compression spring 89 is fitted on the contact spindle and the contact disc 98 is movable on the spindle and pressed by a spring 90 to afford a springy contact to the switch.

The spindle is reduced in diameter at 91 and a trip lever 92 fixed on a vertical spindle 93 may be caused to engage in the reduced portion under the influence of a tension spring 94 when portion 91 of the contact spindle is raised to the level of the lever. On the spindle 93 there is also fixed a lever 95 which engages with an adjustable cam segment 96 as shown in the figure, the cam segment being fixed on to the face of another cam 97 which is fixed on a part of the cam-shaft 52 of the fuze-setter which extends into the starting box 9. Thus if the contact spindle has been raised by the plunger 83 and retained by the trip lever 92, as the fuze-setter cam shaft rotates, the trip lever 92 will be withdrawn from the groove formed by the reduced portion 91 of the contact spindle at a predetermined time in the cycle of operations and then the spindle will move down again under the action of the spring 89 and break the switch contacts, thus causing the motor to stop.

In Figure 4 there is also shown a switch or timing contact device for the loading tray motor which operates to close the circuit to the tray motor after the fuze has been set, and the head of the fuze-setting apparatus is withdrawn clear of the loading tray, and also to break the circuit to the tray motor as the cam-shaft of the fuze-setter completes one revolution. The device comprises a contact spindle 99 which is slidably mounted in a bush formed in the upper part of the casing of the box 9 and provided with a spring 100 which tends to urge the contact spindle downwards. The upper part of the spindle is provided with a circular contact disc 101 which engages with a pair of contact studs 102 mounted on the insulating block 87 previously referred to. A spring 149 similar to the spring 90 is also provided for this contact disc. The lower end of the spindle 99 is formed, as shown in the figure, to constitute a cam follower which is engaged and moved vertically by an adjustable cam segment 103 which is fixed on a cam 104 mounted on the cam-shaft 52.

As the cam-shaft 52 on the fuze-setting apparatus rotates, the cam 104 moves round with the adjustable cam segment 103 until such time as the fuze-setter has set the fuze and is withdrawn clear of the loading tray 5 when the adjustable cam segment 103 engages the lower end of the contact spindle 99 and raises the same so that the switch makes contact and completes the circuit to the tray motor 10. The electric leads shown in the figure will be referred to later on when the electric circuit is being described. As the cam segment 103 moves on, it eventually disengages from the spindle 99 and the circuit is broken by the action of the spring 100.

The two cams 97 and 104 comprise the round receiver actuating cams and are engaged by rollers 105 and 106 which are mounted as shown on a yoke-shaped cam lever 107 which is pivoted at 108 to the casing. The free end of the lever is coupled by a pin 152 (see also Figure 34) to a rod 109 which is slidable in the right-hand lower corner of the casing. The rod is bored to receive a spring 110 which surrounds a screwed stem 111. As the rod 109 rises and falls under the influence of lever 107 and cams 97 and 104 the pivoted elements 167, 168 (Figure 9) of the round receiver, which will be described in detail later, are caused to move to and fro and the spring 110 allows the inward position of the elements 167 and 168 to vary according to variations in the diameter of the round where the elements press on the round and steady it in the loading tray. These variations in the round diameter at positions in the neighborhood of the pivoted elements are due partly to actual physical differences in the same kind of rounds and partly to differences in the lengths of different kinds of rounds which are of course of tapering shape.

At the left-hand upper corner of Figure 4 there is shown a lamp bracket 112 to contain a red lamp which glows when the circuit is live, and all the electrical connections are in proper order.

Referring to Figure 5; it will be seen that on the end of the cam-shaft 52 and outside the box 9 there is fitted a hand crank 113. This crank is detachable and is only used when it is desired to move the parts by hand, or if the power fails, to enable the apparatus to continue in service. The handle operates the fuze-setter and the pivoted elements of the receiver.

If desired the fuze-setter may embody the dead time device described and shown in United States Patent application Serial No. 466,807 filed November 24, 1942, now abandoned.

Main switch box

The electrical apparatus is all operated from a 24 volt secondary battery (289, Figure 23) which is housed in a box carried on the gun mounting at the left hand side behind the structure 27. Cables from the battery are contained in a flexible conduit 119, Figure 1, and lead up to the box 24 which contains the main switch.

Figure 6:
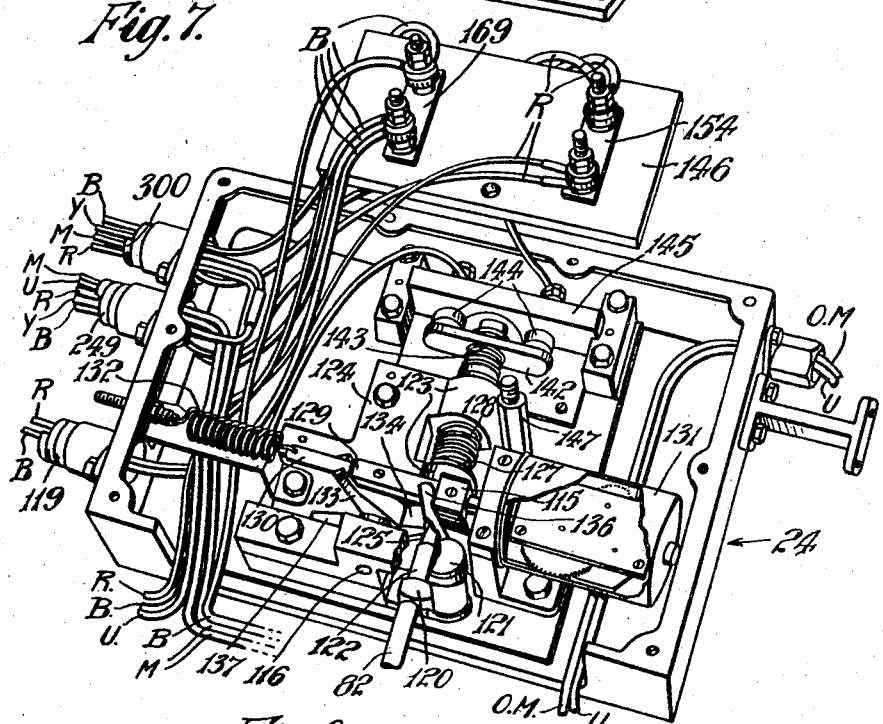
Figure 6 is a perspective view of the interior of a casing which is fitted to the top of the fuze-setting apparatus and contains the main switch and associated parts.
Figure 8:
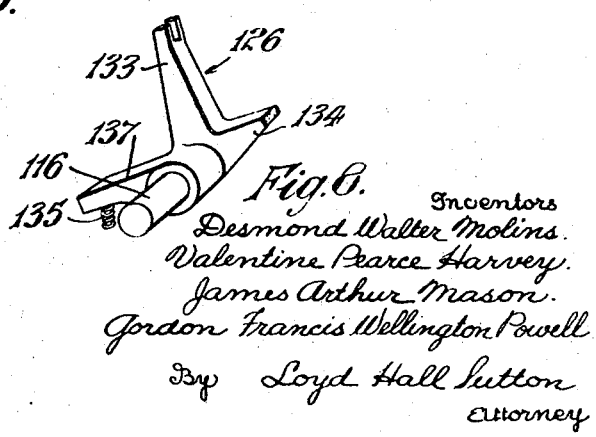
Figure 8 is a perspective view of a lever shown in Figure 6.

Referring now to Figures 6, 7, 8, 35 and 36, the shank of the spring plunger 82, Figure 4, which is also shown in the lower part of Figure 6, engages one arm 120 of a bell-crank lever (120,136) pivoted at 121 to the casing of the box 24 and the other side of said arm is in contact with one end of the stem 122 of the main switch. The stem 122 is slidable in bearings 123 formed in a bracket 124 fixed to the base of the casing and near the end engaging the bell-crank lever a circumferential groove 125 is formed into which part of a retaining lever 126 shown in Figure 8 may move when the stem 122 is pushed inwards. The stem 122 has a thin collar 127 on it and a spring 128 between the collar and one of the bearings serves to force the stem back as soon as the retaining lever is caused to move out of the groove in the stem as described below. Pressure on the plunger 82 therefore moves the switch stem inwards and makes contact as described below and the same movement sets into action a clockwork escapement or timing device 131. This latter device comprises a small spring driven motor and has an escapement consisting of an air vane so that when the spring is energised and the mechanism released, the motor runs down within a fixed period of time, in the present example 3½ seconds.

A block 129 is fixed on to a square rod 130 which forms part of the motor, said rod being slidable longitudinally in the casing of the motor 131. The rod has a rack (not shown) formed on it which engages with a small pinion of the motor mechanism so that when the rod is moved further into the casing of the motor a tension spring 132, attached to the casing of the box 24, is stretched, and when the rod is free to move in the opposite direction the motor is driven by the rack and pinion and runs at a speed determined by the gearing and the air vane, which as aforesaid brings the motor to a standstill at the end of 3½ seconds. The purpose of this device is to ensure that the main circuit is broken after the cycle of fuze-setting and loading is completed in order to prevent wear or damage to the motors and wastage of current. The block 129 forms a shoulder which can engage two lugs formed by a slot in an arm 133 of the retaining lever, Figure 8, which embrace the square rod 130.

When the spring loaded plunger 82 is forced in by the switch striker 81, the retaining lever 126 is rotated on its spindle, by the pressure of a compression spring 135 referred to below, so that an arm 134 of said lever, which is at that time engaging the full diameter of the stem 122, moves into the groove 125 in the stem 122 as soon as the groove is in alignment therewith. At the same time an arm 136 of the bell-crank lever presses against a block 115 fixed on the rod 130 of the motor and moves the rod to the right and tensions the spring 132. The retaining lever is pivoted on a pin 116 mounted in a bearing at the bottom of the box 24 and is urged to move in a clock-wise direction, as viewed in Figure 8, by a compression spring 135 which engages the third arm 137 of the lever 126 as shown and the base of the casing of the box 24. As the spring motor runs down and stops, the bell-crank lever is moved in the opposite direction by the block 115 on the rod 130, (the pressure on the spring plunger 82 being released at this time) and the block 129 on the square rod presses against the arm 133 and pushes the retaining lever 126 out of the groove 125, the stem 122 springs back, and the switch opens.

In case of emergency when it is desired to break the circuit of the starter switch before the period of 3½ seconds controlled by the spring motor has elapsed, or in the event of any breakage or holding up of the parts, the stem 122 may be released so as to break the switch by means of a releasing plunger 138, Figure 7, which is slidably mounted in a bearing 139 in the cover 117 of the casing, and provided with a compression spring 140 which normally keeps the releasing plunger in the inoperative position. A cap 141 is provided to prevent accidental use of the releasing plunger. This plunger 138 when pressed engages with the upper surface of the arm 137 of the retaining lever, Figure 8, so that pressure thereon lifts the arm 134 out of the groove 125 in the stem 122. The other end of the stem 122 is provided with a contact bar 142 which is freely mounted on the stem and pressed by a spring 143 to afford a springy contact between the bar and two contact studs 144 which are fixed on an insulating block 145. When the contact bar engages the studs they are electrically connected, thus joining up the positive lead from the battery previously broken at the studs. When contact is made, the lamp in the lamp bracket 112, Figure 4, lights up. An insulating terminal block 146 is fixed above the switch by the screwed pillar 147 and furnished with connection plates 154 and 169 referred to later when the circuit is being described. The electric leads shown in Figure 6 will be discussed when the electrical circuit is being described.

*Round receiving device or receiver*

The receiver is used to receive a round from the loading man and is furnished with pivoted elements 167, 168 (Figures 1 and 9) adapted to tilt the round into the loading tray automatically under action of the cam 104 (Figure 4) on the shaft of the fuze-setting machine. When a round is on the receiver it cannot be tilted on to the tray until the loading cycle has been completed and the empty tray is back in the receiving position; this is due to the fuze-setter interlock timing drum, described later, which breaks the circuit and prevents it being again completed through the fuze-setting machine motor until the loading cycle has been completed. A round cannot be placed on the receiver until it is returned to the receiving position, therefore two rounds cannot be placed on the loading tray at one time. As the fuze-setter continues to move, the cam 97 reverses the direction of movement of the pivoted elements and returns them to the receiving position.

Referring to Figures 9 to 11, the parts comprising the receiver are carried on bars 155, 156, 157, 158 attached to two supporting brackets 150 and 151. The bracket 150 is fixed to the bracket 23, Figures 1 and 30, attached to the lower part of the fuze-setter casing, and the bracket 151 is fixed to a curved arm 153 which projects from the timing drum box 11. The two brackets are connected by four bars, viz: two upper bars 155 and 156, a lower outer bar 157, and a lower inner bar 158. To the upper bar 155 brackets 159 are fixed, and a shield 160 is screwed to these. Further support for the shield is described in the next paragraph. This shield is provided because the breech and other recoiling parts move along just behind it and the shield safeguards the loader and prevents a round from being accidentally dropped on to the recoiling parts.

The two upper bars 155 and 156 support two upper guides 161 and 162, the ends of which project downwardly and form a guide for the round when it rolls from the receiver into the loading tray. The upper parts of these guides 161 and 162 form additional support bracket for the shield as shown in Figure 9.

The two lower bars 157 and 158 support two guides 163 and 164 which co-operate with the guides 161 and 162. The upper sides of the guides 163 and 164 are curved away as shown to provide clearance when placing a round on the receiver. Each guide has a forked projection 165 which forms a guide for a semicircular extension 166 fixed to each of two tilting arms. The tilting arms 167 and 168 are keyed on a shaft 170 which is journalled in bearings in the brackets 150 and 151. Each tilting arm has the lower part (i. e., where the lead lines end in Figure 9) of its upper surface made concave as shown and curved to suit the part of the round which rests on it, and the remaining portion of the arm is formed to a convex curve as shown to engage and steady the round when in the tray 5. This portion of the front tilting arm 167 is provided with a rubber pad 171 to steady the shell as the round engages the tray. The curved extension 166 on each arm is slidable in the forked projections 165 previously referred to, and these curved arms may be used as handles if the receiver is to be operated by hand, for example when setting up the apparatus. Normal hand operation of the tilting arms is performed by the hand crank 113 as previously described. An adjustable stop 172 is fixed to the bracket 151 and serves to locate the base of the round in the proper position. This stop may be adjusted to suit different kinds of rounds as the various fuzes fitted require the round to be in correspondingly different places for the fuze-setting.

The tilting arm shaft 170 is provided at the forward end with a toothed quadrant 173 which engages with an operating quadrant 174 mounted on a stud 175 which is fixed to the supporting bracket 150.

A lever 176, consisting of a flat plate adjustably attached to the body of the quadrant as shown in Figure 10, is forked as shown and a coupling link 177 is pivoted in the fork at 178. The upper end of the coupling link is connected at 179 to a fork 180 attached to the lower end of the screwed stem 111 referred to in the description of Figure 4. Thus as the fuze-setter shaft rotates, the receiver tilting arms 167 and 168 are operated first in one direction to deliver a round to the loading tray and then move back again to the round receiving position. The arms cannot be operated again until the next cycle, because they are operated through the fuze-setter by the cams 97 and 104 as previously explained.

The pivoted elements 167, 168 are operated from the fuze-setting machine 7 in such a manner that when the fuze-setter 7 commences to operate, the pivoted elements are first caused to move over and deliver the round to the tray 5 and thereafter to engage the round in the tray 5 to steady it, and after a predetermined time the head 8 of the fuze-setter 7 commences to move over the nose of the round which is held still by the pivoted elements 167, 168 until properly engaged by the head 8 of the fuze-setter. In the fuze-setter described in United States application Serial No. 466,808 the fuze-setter cycle took 1 second, but in the arrangement now being described the fuze-setter cycle is arranged to take 1¼ seconds. The first ¼ second is occupied in swinging the pivoted elements so as to transfer the round from the receiver to the loading tray, and during the remaining second the fuze-setter head moves over the round, sets the fuze and withdraws. Thus it will be seen that it is important that the pivoted arms should, when transferring the round to the loading tray, continue their movement to ensure that the round settles in position without delay.

Loading tray and rammer

As previously mentioned when describing Figure 1, the loading tray 5 is of known general construction and the shape of the tray can be seen from Figures 12 and 29. The tray is rocked from a firing position, where it receives the round, to a loading position in line with the breech where the round is rammed, and during this movement a known mechanical interlocking device referred to later when describing the firing gear is operated to prevent the breech block being completely closed, thus preventing the firing of the gun before the loading tray has swung sufficiently far back as to be out of the way of the breech as the latter recoils. The tray is rocked back again for a fresh round and on this second movement the interlock is released. An electrically driven rammer 15, already mentioned with reference to Figure 1, is shown in Figure 12.

To suit this ramming gear the tray has guide rails 181 fixed to it along which the rammer travels, and part of the tray is overhung at 182 to provide a cover or housing for the rammer and the cables. The pulleys 17, previously mentioned, are supported on pivots mounted in brackets 183 fixed to the tray, and the cables are housed, so far as is possible, in guide tubes 184. As previously mentioned with regard to Figure 9, the receiver for the rounds from which they are delivered into the loading tray is provided with an adjustable stop 172, and the lengthwise disposition of a round in the loading tray depends upon the location of the adjustable stop in the receiver.

The pulleys 18 are supported on pivots in brackets 185 and 186, the bracket 185 being arranged to swivel to change the direction of the cable should hand ramming have to be resorted to. The method of ramming by hand will be described later on. The tray is provided with a handle 187 so that it can be moved to and fro by hand when required.

The cable drum 19 is mounted in a housing 188 which is movable on a slide 189 so that the housing may be moved down when necessary to take up slack in the cables. For this purpose the slide is furnished with a ratchet 190 into which a spring pressed pawl attached to a pin 191 mounted in a bearing 192 formed in the housing is arranged to engage. The pin is provided with a knob 193 whereby the pawl may be withdrawn from the ratchet teeth and then the housing may be pulled downwards to tighten the cables as necessary, and when the knob 193 is released the pawl will hold the housing firmly in position. By means of this adjustable device the cables can be kept at a substantially constant tension thereby reducing back lash and assisting in securing a constant ramming time and thereby contributing towards the attainment of a constant dead time.

The rocking bracket is provided with a tray locking bolt 194 for use when hand loading is being performed, and this will be described later when the hand method is being described.

The principal features of the rammer have already been described with reference to Figure 1, but the details are more clearly shown in Figure 12, where the parts bear the same references as those used in Figure 1. At the end of the flexible shaft 20 which is supported in a bearing 148, there is fixed a small gear-wheel 195 which engages with a larger gear-wheel 196 fixed to the grooved drum, the two parts being rotatable on a shaft 197 which is fixed in the housing 188. In order to guide the cable into the grooves of the drum, there is provided a cable guide consisting of a bar 198 which slides in holes formed in the housing 188 and carries a slotted cable guide 199. A pin (not shown) projects from the bar 198 into the groove of the drum 19 and causes the bar to traverse to and fro and guide the cable as necessary. The rammer 15 consists of a metal block attached to the cables as shown and provided with rollers 200 which engage on the guide rails 181 to reduce friction. The rammer is provided with spring buffers 201 to diminish the shock as the rammer strikes against the round or the end of the loading tray on its operative and return strokes respectively. These buffers consist of two plungers mounted in the rammer and pressed apart by a spring inside the rammer. The loading tray is brought against fixed stops to limit its swinging movement about the cylindrical member 6 in both directions that is to the loading position and to the firing position. One of these stops is shown in Figures 1 and 38, and comprises an abutment 202 which is fixed on a bracket 203 clamped on the cylindrical member 6, and is engaged by a lug 204 on the lower part of the tray rocking bracket 13. In addition to this, there is a further abutment 205 (see Figures 1, 12 and 37) at the other end of the loading tray rocking bracket which engages with an abutment 206 fixed on the cylindrical member 6, because as the mass of the tray is considerable it is desirable to stop it at both ends when it is carrying a round. Another stop 525 which is fixed to the breech ring 500, see Figure 24, limits the movement of the tray in the other direction.

Referring to Figure 13 which shows outlines of part of the loading tray rocking bracket 13 in chain lines, there is attached to the right hand side of said bracket looking towards the muzzle of the gun, an anchor bracket 207 carrying a pin 208.

This pin which is readily detachable from the bracket 207, is embraced by a connecting rod end 209 which comprises a silent-bloc bearing and is attached to a rod 210. This rod is provided with right and left hand screw threads and a central hexagonal portion 211 for rotating the rod, and the other end is threaded into a further connecting rod end 212.

Lock nuts 213 are provided for locking the threaded rod when necessary adjustment in the length of the connecting rod has been made. The whole assembly forms an adjustable and resilient connecting rod. The end 212 of the rod engages a crank pin 214 fixed on one end of a crank 215 which has an adjustable throw capable of being regulated by a screw 216 as shown. This crank is fixed to a worm-wheel shaft which will be described in more detail when the tray motor is being described. The purpose of the silent bloc bearing in the connecting rod is to ensure that the loading tray will always come to a definite position against the fixed stops when it moves into either of the two operative positions, the silent bloc member permitting the length of the connecting rod to vary slightly, as may be necessary. When hand operation of the tray is resorted to, the pin 208 is pulled out.

As will be seen later a mechanical braking device (top half of Figure 19) is provided on the tray-motor 10 and the current to the motor is interrupted at some point before the crank 215 reaches its dead center position. But according to the conditions of the weather and the accumulator (not shown), the position at which the crank pin 214 comes to rest will vary slightly. To ensure that the loading tray 5 will always engage the fixed stops 202, 206 or 525 as the case may be, more particularly when it moves to the loading position, the length of the link 210 connecting the crank to the loading tray 5, is as previously mentioned made resiliently adjustable. As the tray 5 moves over, the motor 10 is braked and stops, and if the tray 5 has not already reached the fixed stops 202 and 206 or 525 the last effort due to the inertia of the moving tray 5 tends to compress or stretch the connecting rod as the case may be, and the resilience of the rod is sufficient to allow the tray to reach its proper position against the stops in question.

As the crank 215 moves through the half revolution to swing the tray 5 to the firing position, the tray 5, if it is not out of the way of the breech, will be pushed out by the breech during the recoil due to the link 210 being compressible so that no damage will occur. The extent by which the length of the link 210 is reduced by this compression is quite small. Since as is the custom with guns of this kind, the tray 5 is already provided with an inclined surface which provides a suitable lead for the breech, the resilient link acts as a safety measure.

Should the power supply to the gun fail, or if for any reason it is desired to manipulate the apparatus by hand, the loading tray locking bolt 194 (Figure 12) previously mentioned is brought into use. The bolt comprises a cylindrical member as shown provided with a flange or nut 220 which engages with a face of a boss 221 on the rocking bracket and limits the downward movement of the bolt. Inside the boss 221 of the rocking bracket which houses the locking bolt there, as shown in Figure 29, is a spiral compression spring 894 tending to move the bolt downwards, and the lower end of the bolt is tapered to engage in one of two recesses 895, 896, formed in the cylindrical member 6, the recesses being so located that the locking bolt will hold the tray in either of the two positions. In the upper part of the bolt there is a slot 222 in which is located the rounded end of an actuating lever 223. This lever is fixed on a shaft 224, see Figure 14, mounted in suitable bearings 225 in the rocking bracket and also fixed to the shaft is a bolt releasing lever 226. When the apparatus is being operated automatically, the releasing lever 226 is held in the operative position (that is the locking bolt is disengaged) by a pin 227 which is passed through two holes in the handle 187 of the loading tray.

When it is desired to operate the rammer by hand the cable drum housing 188 is released by means of the knob 193 previously referred to, to slacken the ropes, and then the return rope 33 is removed from the rammer and drum 19. The ramming rope 16 is then disengaged from the drum 19 and a cross-handle is attached to the free end of the rope and by pulling this end of the rope outwardly away from the tray it is easy to manipulate the rammer manually. The pulley bracket 185 will swivel as necessary to accommodate the new direction of the rope.

Rammer motor

Figure 15:
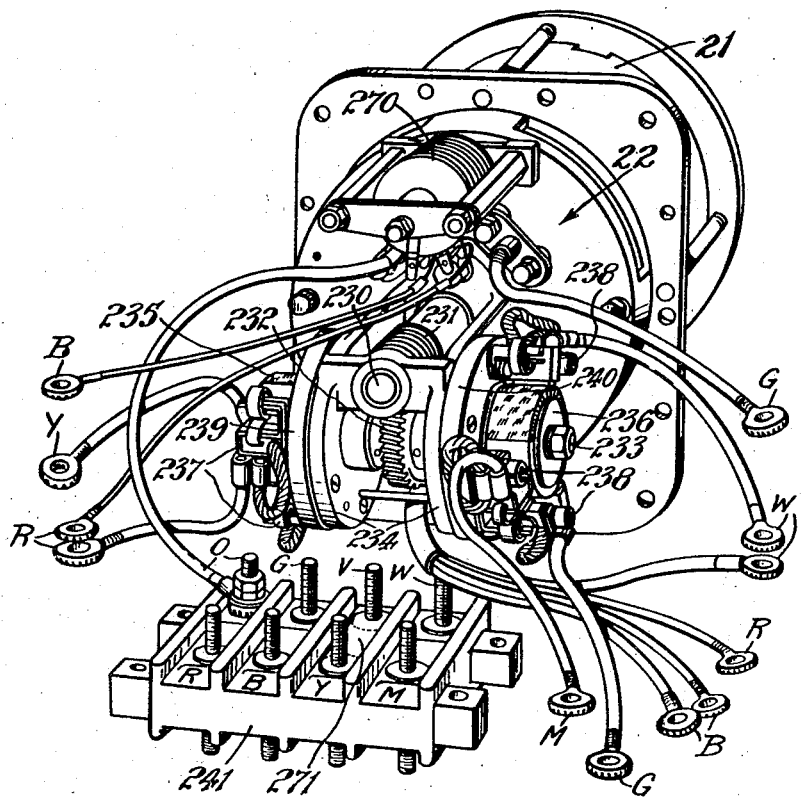
Figure 15 is a perspective view of the rammer motor and the parts contained in a box which is attached thereto.

The rammer motor 21 (Figure 1) which, as previously mentioned, drives the rammer through the flexible shaft 20, has on the end opposite that to which the shaft is attached a box 22 which contains the apparatus shown in Figure 15. As will be seen from this figure, the motor shaft 230 has a worm 231 thereon which engages with a worm-wheel 232 fixed on a shaft 233 journalled in brackets 234 which also house the worm-wheel and the worm. At each end of the shaft there is mounted a contact timing drum, the drum 235 at the left-hand end being the rammer motor timing drum, and the drum 236 at the right-hand end being the tray return start timing and rammer braking drum. The metallic segments of the drums are indicated by hatchings.

Suitably mounted contact brushes are arranged on each of these drums, two brushes in brush holders 237 being provided on the drum 235, and three brushes in brush holders 238 on the drum 236. The brush holders are mounted on insulating discs 239 and 240. The brushes are connected to the leads as shown which are fixed on the studs of the terminal block 241 in accordance with the reference letters on leads and block. It will be noted that two studs are connected together by a connecting plate 271. Further description of the leads will be deferred until the electric connections are being discussed, but it may be mentioned here that wires from the studs R, B, Y, and M pass through a flexible conduit 300, Figure 1, to the main switch box 24 and wires from the studs W, O, G, V pass to the breech switch through a flexible conduit 301, Figure 1. Above the rammer motor shaft 230 there is fixed to the motor casing a rectifier 270.

Tray motor and timing drum box

Figure 16:
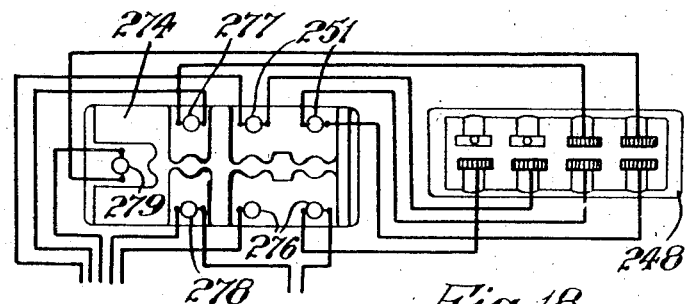
Figure 16 is a perspective view partly broken away of the tray rocking motor, a box attached thereto containing switch gear and some other parts associated with said motor.

The tray motor is for rocking the loading tray to and fro at the desired intervals, and consists of an electric motor 10 having a worm 272, see Figure 19, coupled to its armature shaft 273 which engages with a worm-wheel 242. The worm-wheel shaft 243 extends at one end through a bearing 244 (Figure 16) and is connected as shown in Figure 13 to the crank 215 to which the adjustable connecting rod coupled to the loading tray is attached.

The other end of the worm-wheel shaft projects into the timing drum box 11 and has fixed thereto three timing drums, which are shown separately in Figure 17, and comprises a tray motor control timing drum 245, a rammer motor start timing drum 246, and a fuze-setter interlock timing drum 247. The first mentioned drum is provided with two metallic segments shown hatched separated by two insulating segments. The other two drums have each one metallic segment and one insulating segment. Behind the drums Figure 16 there is a brush holder 248 having six brushes which are arranged as shown in Figure 18 from which wires lead to a terminal block 274 inside the box. This block comprises five connection plates 251, 276, 277, 278, 279 refered to again when describing the circuit diagram.

Five leads from the terminal block pass down through a flexible conduit 249, see also Figure 1, and lead to the main switch box 24. The other two leads go to the tray motor.

In order to facilitate the setting of the apparatus the armature shaft 273 of the motor 10 is provided at its lower end with a knurled hand knob 250 keyed to the shaft so that by turning the knob the shaft is rotated and the loading tray is thereby moved, but naturally this operation is very slow and is only used for adjustment purposes.

At the upper end of the worm on the motor shaft there is provided a friction brake, see Figure 19, comprising a friction washer 280 mounted on the end of the worm and engaging a friction disc 281 which is prevented from rotation by being keyed to the bush 282 which surrounds the shaft. This bush is threaded on its exterior and a corrugated hand nut 283 can be screwed up or down on it. The nut, when adjusted, is fixed in position by a pin 284. Between the interior face of the end of the hand nut and the friction washer there is arranged a compression spring 285 so that as the nut is screwed up or down the degree of braking pressure is varied. The brake is described and illustrated herein solely for the purpose of fully explaining the construction and operation of the gun but the brake forms the subject matter of another application and no claim is made herein to the brake, either per se or in combination with the rest of the construction. The function of the brake is to stop the motor as soon as possible after the current is cut off. The brake is, however, not operative while the current to the motor is flowing but comes into operation immediately the current ceases. This is effected automatically in the following manner.

The worm 272 is, as aforesaid, connected to the armature shaft, but the connection is such that the worm can move lengthwise with respect to such shaft. As shown in Figure 19 a small collar 275 is fixed on the end of the armature shaft and in practice the end of the worm is connected to this collar by means of a key, but as the drawing is so small the connection is shown as a pin 286 which is fixed in the collar and extends into a hole in the journal of the worm, so that the worm can move lengthwise and away from the end of the shaft.

At a fixed time in the cycle the current to the tray motor is cut off and as aforesaid the loading tray (and the round, if the tray is loaded) form a mass of considerable weight and therefore the current is stopped a short time before the tray brings the round into either of its stationary positions, the final movement being effected by the inertia of the heavy moving mass.

When the motor is driving the worm and worm-wheel and moving the loading tray, the thrust due to the reaction between the thread of the worm and the tooth of the worm-wheel is such that it can be met by a thrust race 287. When the current to the motor is cut off, the tray will continue to move onwards due to its inertia and thus the worm-wheel will tend to overdrive relatively to the worm and the direction of pressure between the worm thread and the worm-wheel tooth is reversed. The worm is therefore moved axially although it is still coupled to the armature shaft by the driving pin. The axial movement of the worm will cause the friction members of the brake to engage with a degree of pressure determined by the spring 285 and the adjustment thereof by the cap 283. Another thrust race 288 is shown at the opposite end of the worm but when the motor is driving the worm-wheel there is a small space between the flange on the worm and the collar of the thrust race. This space is of about .050 thickness, and before it is taken up by the axial movement of the worm, the brake is brought into effective operation, but the thrust race forms a fixed abutment to limit the extent of axial movement of the worm. Any minor discrepancies in the position of the loading tray are covered by the action of the resilient connecting rod as previously described.

In guns such as the gun adapted to a mobile mounting as previously mentioned, when describing the loading tray, there may not be room for the connecting rod which oscillates the tray to move through a complete cycle. In such cases a reversing switch is fitted to the tray motor. The switch is reversed at the end of each tray movement by the crank striking against pins which operate the switch and thus the motor runs in different directions for each crank movement.

*Tray motor interlock switch*

The purpose of this switch is to prevent the tray motor circuit from being completed to rock the loading tray from the firing position until the breech is open.

It is fixed, as shown at Figure 1, to the side of the fuze-setting apparatus, and consists, as shown in Figure 20, of a casing 252 containing a switch and operating mechanism therefor. Inside the casing there is journalled a vertical actuating shaft 253 at the bottom of which is fixed a lever 254 which carries a roller 255 at its free end.

The shaft is supported in bushes in the casing and near the upper end it has fixed thereto a contact block lever 256. The contact block lever has an extension arm 257 on the opposite side of the shaft which is recessed to form a seating for one end of a compression spring 258. The contact block lever is furnished with three holes, the lower two of which are insulated for screws which fix a contact block 259 to one face of the lever. The upper hole has a screw 260 fitted therein which forms an adjustable stop and abuts against a lug 261 depending from the top of the casing. These two parts serve to limit the movement of the contact block lever in one direction, that is when contact is being made. At the rear of the casing there is fixed an insulating block 262 to which terminal studs 263 are secured. A further side insulating block 264 is fixed to the first mentioned block and the latter block is furnished with two grooves in each of which there is fixed a contact spring 265 and a contact blade 266. The free end of each blade has a contact block 267 fixed thereto, and to each block there is secured a flexible strip of copper braid 268, the other ends of the strips being connected to the terminal studs as shown. Two wires lead from the studs as shown, one being connected to one of the tray timing contacts 102 and the other to one of the fuze-setter motor contacts 114 in the casing 9. See the circuit diagram, Figure 23.

When the breech is closed, the upper of two breech-retaining catches 503 (Figures 40A, 40B, 43 and 44), which are located at the top and bottom of the opening 501 in the breech ring 500 (Figure 24), turns on its pivot 502 and by its tail portion 600 moves the roller 255 and actuates the lever 254 so that the actuating shaft and contact block lever are rotated, the contact block 259 is withdrawn from the flexible strip contact blocks 267 and the circuit to the tray rocking motor is broken at this point. Therefore, although the tray timing contacts are connected during the cycle of the fuze-setting machine, the circuit to the motor is not completed and the loading tray remains in the firing position. The rotation of the contact block lever compresses the spiral spring 258.

When the breech is open, the upper catch 503 is rotated on its pivot in the reverse direction by an interior spring 602 (Figures 43 and 44) and releases the pressure exerted on the roller 255 by the tail portion 600, whereupon the spring 258 rotates the contact block lever and the shaft and lever 254; the contact block 259 is forced on to the contact blocks 267 thereby completing the circuit through the switch.

*Breech interlocking and rammer reversing switch*

The breech interlocking and rammer reversing switch which is enclosed in a casing 290 (Figures 21, 24 and 25) is a double pole change-over switch and is secured on top of the hand firing lever supporting bracket 323 on the right-hand side of the gun cradle, see Figure 25. Its function is to reverse the direction of flow of electric current through the rammer motor after the round has been rammed into the gun, and again when the breech is open after firing.

The switch is shown in perspective in Figure 21 and comprises the casing 290 in which is supported an operating spindle 291 to the lower end of which there is fixed a lever 292 carrying a roller 293. On the spindle there is fixed a metal plate 294 to each side of which there is fixed an insulating block 295 and on these blocks there are mounted spring blades 296 which have contact blocks 297 at their ends and can engage with fixed co-operating contact blocks 298 mounted on an insulating panel 299 according to the position of the roller lever. The spindle 291 and all the parts attached thereto are moved about the spindle axis in one direction, that is clockwise as viewed from the top of Figure 21, by a compression spring (not shown) interposed between the casing and the rear insulating block 295 while the assembly is moved in the opposite direction by the roller 293 as recited below.

The switch is reversed as the breech block closes under action of the breech-closing spring, and again as the gun arrives at the run-out position with the breech block in the open position. On the run-out, the breech block engages the lever roller 293 and rotates the lever in an anticlockwise direction as viewed from the top of Figures 21 and 25, compressing the spring above mentioned, which is interposed between the casing and the block 295.

*Circuit and operation*

The various units for handling the round have been described and their individual operation outlined and the following description of the combined operation of the parts will complete the description of this part of the invention.

When the switch striker 81 is pressed, the apparatus goes through a cycle of operations in the sequence given below during which it operates to:

(a) Transfer a round from a round-receiver in which it is placed manually, to the loading tray by tilting part of the receiver.

(b) Engage the setting head of the fuze-setting machine with the fuze, set the fuze, withdraw the setting head clear of the fuze, return the fuze-setting mechanism to the starting position and return said part of the receiver to the receiving position.

(c) Rock the loading tray from the firing position to the loading position.

(d) Ram the round into the gun chamber.

(e) Withdraw the rammer and return the loading tray to the firing position.

(f) Automatically fire the gun.

Before the round is placed in the receiver, it is essential that the fuze is set at "Safe," if a fuzesetter of the knife type, such as that described and illustrated herein, is employed.

The fuze-setter cycle takes 1¼ seconds, the first ¼ second of which is used in transferring the round from the receiver to the loading tray. The subsequent operations up to the time the round is fired and the tray is back in the firing position take approximately 1 second, making a total for the complete operation of 2¼ seconds. In 3½ seconds after the striker is pressed the circuit is broken by the spring motor escapement, but it is possible to start a new cycle in the time between the end of the 2¼ second period and the 3½ seconds. If the switch striker is pressed the switches will be put on as before and the rod of the spring escapement pushed back again to wind up the spring motor.

If the power fails the fuze-setter and receiver may be operated by the hand crank, the pin on the tray driving crank withdrawn, the locking bolt on the loading tray brought into use and the tray moved to and fro by hand. The rammer cables are dismantled from the drum and the rammer operated by hand.

If remote control is in use the oil unit is running and the control member of the fuze-setter automatically moved. If not, the predictor receiver is manned, the oil unit clutch disengaged, the handwheel coupled to its shaft and the control member of the fuze-setter is regulated by the follow-the-pointer method.

In Figure 23 which shows the circuit the wires are marked by reference letters corresponding to a colour scheme used in practice and the wires shown on each drawing of the separate units are similarly marked. The principal lines in the figure are shown by different types of line while the minor wires are shown by thin lines.

Referring to Figure 23 the rammer motor 21 is a compound motor and is arranged for reversing and the control of the motor is effected by three of the above-mentioned contact timing drums 235, 236 and 246 and also by the breech interlocking and rammer-reversing switch in the casing 290 in the manner to be described later.

The rectifier 270 is shunted across the shunt field of the motor 21 as explained later to discharge induced current from the motor 21 and prevent sparking at the main switch 142, 144 when it breaks.

The fuze-setter motor 14 is also compound wound and is controlled by the switch contacts 98—114 and the contact timing drum 247 and operates the tray timing contact switch 101—102 by the cam 103 located in the casing 9 as previously described.

The tray motor 10 is also compound wound and is controlled by two of the remaining contact timing drums 245 and 246 and further control is effected by the tray switch contacts 101—102 above mentioned, which are operated by the fuze-setter motor, and the tray motor interlocking switch contacts 259—267.

The sequence of operations and further details of the apparatus will now be described.

The operator drops a round in the receiver and immediately presses the switch striker 81. This movement moves the main switch contacts 142—144 into the "on" position, "makes" the fuze-setter contacts 98—114 and winds up the spring motor escapement 131. Immediately the operator ceases to press on the switch striker 81, the spring plungers 82 and 83 move back again to their original position.

When the fuze-setter contacts 98—114 and the main switch contacts 142, 144 are brought into the "on" position as explained above, the connection plates 154 and 169 are joined to the battery by R and B lines respectively, and the signal lamp in the bracket 112, which is connected to said plates also by R and B lines, lights up and remains alight as long as the main switch is "on," i. e. as long as the spring motor escapement is running.

From the lower stud on the plate 154 an R line leads upwards and round to the casing 11 where it is joined to a stud on the connection plate 251, and from thence other R lines lead to the lower brushes on the timing drums 246 and 247, and to the right-hand lower brush on the timing drum 245. At this time the timing drum 247 is still and is so disposed that the two brushes are joined by the segment of the drum and the current flows out by the other brush to the line U which leads downwards to a stud on the connection plate 279, and thence by a U line to the left hand contact 114 of the fuze-setter contact switch. As these contacts are already closed by the contact bar 98, the current passes through the bar to the other contact 114 and by the line marked R. O. to the fuze-setter motor 14, and back by a B line to the connection plate 169. The fuze-setter motor 14 therefore runs and operates the pivoted arms 167 and 168 of the receiver so that the round is delivered to the loading tray 5 where it is located and held by said pivoted arms. A predetermined time interval (¼ second) is allowed for this movement, whereafter the head 8 of the fuze-setter advances towards the round, engages and sets the fuze, and then withdraws, all in a fixed time (1 second), the time of each separate operation being determined by the cams 97 and 104 and the fuze-setter cams 54, 67 and 68 and the whole operation taking place in one revolution of the cam shaft 52. The pivoted arms 167, 168 of the receiver move back as soon as the fuze is engaged by the head 8 of the fuze-setter 7, after which the round is held in position by its weight, the shape of the loading tray 5 and the fixed knives 65 of the fuze-setter.

At a predetermined time, just as the fuze-setter has finished its operation on the round, and the head 8 is clear of the loading tray 5, the tray timing contacts 101—102 are closed by the cam 103 on the fuze-setter shaft, and this causes the tray motor 10 to start running (subject to further control by the tray motor interlocking switch Figure 20 as described later) in the following manner: At this time there is a circuit through the motor 10 because there is a connection from the right-hand contact 102 via the left-hand line M to the connection plate 276 in the casing 11, from which another M line leads to the tray motor 10 from which a B line leads to a stud on the connection plate 278 from which another B line leads back to the connection plate 169. As aforesaid, the left-hand contact 114 is already connected to plate 154 by the connections through the timing drum 247, and a U line from said left-hand contact 114 leads upwards to the right-hand contact 267 of the tray motor interlocking switch in the casing 252, and if the switch is closed, by the contact bar 259 to the other contact 267 and by the line OM to the left-hand contact 102. Thus if the interlocking switch in the casing 252 is closed the circuit is complete and the tray motor 10 runs and the three contact timing drums 245, 246 and 247 start to rotate. Alternatively it may be said that the closing of the tray timing contacts 101—102, the left-hand contact 102 of which is already connected to the left-hand contact 114 via the tray motor interlock switch, connects a point in the positive lead, between the drum 247 and the fuze-setter motor 14, to the tray motor 10 via the M line from the right-hand contact 102. Meanwhile the fuze-setter motor 14 is still moving and the tray timing switch contacts 101, 102 eventually break which movement also breaks the positive lead to the tray motor referred to in the previous sentence, but as the contact timing drum 245 has, by this time, moved sufficiently far for its brushes to lie on one segment, the tray motor circuit is still alive and is now from the plate 251 by an R line to the right-hand brush on the timing drum 245, and from the other brush by an M line to the plate 276 through the tray motor and via plate 278 to a B line and plate 169. The current to the tray motor 10 is cut off when the drum 245 has rotated so far that its two brushes no longer lie on a single segment, and just before the tray 5 reaches the loading position. This causes the friction brake 280, 281, to operate and the tray is finally located in said position by means of the stop 525.

It sometimes happens that a round fails to fire owing to some intrinsic defect and under these circumstances the breech would not automatically open, as is the usual case. The tray 5 must therefore be kept out of the way until the defective round has been cleared. For this purpose the tray motor interlocking switch Figure 20 is provided. This switch is closed by the automatically opening breech as aforesaid, and unless the breech opens, the switch does not close, in which case the tray motor cannot start.

Just after the new circuit to the tray motor 10 is opened as above described, the fuze-setter cam 96 breaks the contacts 98—114 and the motor 14 stops. This also breaks the circuit through the drum 247 but as aforesaid the tray motor circuit is now independent of that drum.

An instant before the time when the current to the tray motor 10 is broken, that is when the round is almost in alignment with the breech, the drum 246 is in such a position that the two brushes are joined by the segment, a temporary circuit is formed, and the rammer motor 21 starts, subject to any control by the breech switch in casing 290 which ensures that the motor cannot ram unless the breech is open. The circuit to the rammer motor at this stage as shown in Figure 23 is from the plate 251 to the lower brush on the drum 246, and from the other brush by a line Y to the connection plate 277, and thence by line Y across to the casing 22, where the line is joined to a stud Y on a connecting plate 271 fixed on the terminal block 241. From the other end of the connecting plate a line V leads upwards to the breech switch in casing 290 and is connected to the outer contacts of said switch, the lower one of which is engaging a fixed contact which joins the line O which leads downwards to a stud O on the terminal block 241 in the casing 22, and on to the armature of the rammer motor 21. The current passes from the armature by the line G which leads back to stud G on the block 241 and upwards again to the breech switch in casing 290 to the upper of the fixed contact blocks thereof, Figure 23, which is in contact with the upper one of the inner two contacts, and thus is joined to the line W which passes down again to the stud W on the terminal block 241 and on to the series field of the motor, and after passing through the field, by the line B, back to the stud B on the terminal block 241, and thence by line B to the connection plate 169. At the same time the shunt field of the motor is directly connected across the main positive and negative lines by wires marked R. G. and B. G. which, as will be seen from the drawing, are connected to R and B studs on the terminal block 241. From these two studs lines R and B lead to the rectifier 270. The starting of the rammer motor causes the drums 235 and 236 to rotate. A slight movement of the drum 235 makes a new rammer motor circuit independent of that through the drum 246, which circuit ceases on the last movement of the tray motor. The circuit is now from plate 154 by an R line to the stud R on the terminal block 241 to the left hand brush on the drum 235 and out by the top brush to the stud Y and through the breech switch as before. The round is therefore rammed home and the rammer and motor are stalled and brought to a standstill at the end of the stroke. The rammer will remain in position and hold the shell in case the breech-retaining catches 503 fail to release the breech-block and permit it to close. Normally, however, the breech-retaining catches occupy the position indicated in Figure 40A when the breech is open, the ends of the catches entering recesses 603 cut in the upper and lower corners of the breech-block and preventing the latter from closing, but are moved in against the pressure of the springs 602 to the position indicated in Figure 40B as the round is rammed home, thereby releasing the breech-block and permitting the latter to be closed by the usual breech spring. As the breech-block closes, the breech switch in the casing 290 changes over and reverses the current through the rammer motor armature as explained in more detail below.

The first slight movement of the drum 236 disconnects the brushes from the drum segment, but during the further operation of the apparatus the drum 236 has rotated to such an extent that the segment connects the middle and right-hand brushes as viewed in the diagram. Under these circumstances there is now a live connection from the tray motor 10 to the said right-hand brush the line from which leads to the tray motor and then back to the negative of the battery. But it will be seen that the line to said middle brush is a tapping between the armature and series field and, as the resistance of the armature is much greater than that of the field, the available voltage at the middle brush is very low, and, in fact, too low to affect the tray motor.

As the round goes home and strikes against the claws 601 of the breech-retaining catches 503, the latter are rotated around their pivots 502 against the springs 602 and their ends are disengaged from the recesses 603 in the breech-block 310, whereupon the breech-block starts to close automatically in the usual way under the pressure of the breech spring. A short movement (e. g. 1″) of the breech block 310, which is enough to prevent a round falling out of the breech so that the breech block has "masked" the round causes the breech switch in casing 290 to change over so that the current to the armature of the ramming motor 21 is now reversed, the circuit being in general as above recited except that the line V leading to the breech switch in casing 290 is now connected to the line G and the line O to the line W.

It will be seen, therefore, that the breech-block reverses the current to the motor when the breech-block has moved, sufficiently far behind the round to stop the latter coming out of the breech, and thus the rammer is held pressed up against the round in the breech by the power of the motor, which is stalled, and thus the round is held in the breech until the breech-block has masked the round. By this arrangement the round cannot rebound to an extent sufficient to prevent the breech-block from closing, and consequently the arrangement of stalling the motor enables the time taken to ram to be reduced since rebounding, so common with increased ramming speeds, is no longer a material limitation to the speed of ramming.

The return of the tray 5 to the firing position may take place at any convenient time after ramming has been effected, but is done immediately after when the second arrangement of firing mechanism (Figs. 27 and 28) described later is used because as above mentioned, the breech block 310 begins to close as soon as the round operates the breech-retaining catches 503. In the case of the first firing mechanism (Figs. 24–26) described later, after a short movement the closing breech 310 is stopped by the mechanical interlock 341, 342 (Figure 24) on the loading tray, referred to formerly and described later, and the gun fires in that case immediately the breech is fully closed as fully described later with reference to Figures 24–26. The tray must, of course, always be moved out of the way before firing or it would be broken by the recoil.

When the arm 292 of the breech switch in the casing 290 (Figures 21 and 25) changes over as the breech block 310 starts to close, and the circuit has altered as above described so that the armature current is reversed, the previously mentioned live connection to the tray motor 10 through the right hand brush on the drum 236 still exists, but as the line G leading to the breech switch carries a current moving in the opposite direction to that previously existing it will be seen that the line leading to the middle brush and previously referred to as a tapping, is now on the main positive lead from the battery. Thus the full voltage is available across the terminals of the tray motor, and it starts up and moves the tray back. After a time the tray motor 10 rotates the drum 245 to such an extent that the motor can now receive its current through the original circuit via the other segment on the drum 245 as previously described. As this circuit is once again connected in this manner, the circuit from the right hand contact on 236 is broken by further movement of the drum 236 on the return stroke of the rammer and as the drum 245 reaches its original position the tray motor stops with the tray 5 in the firing position. Thus the tray motor is enabled to return the tray to the firing position only after the breech has moved sufficiently far to prevent the round from slipping out of the breech.

On the return stroke of the rammer 15, the rammer motor 21 is stopped and, in order to bring it rapidly to a standstill, dynamic braking is employed. This is brought into operation just before the rammer reaches the end of its return stroke by the segment on the drum 236 which has by this time moved round again to substantially the position shown in Figure 23 of the drawing. As above stated the lines W and O leading to the breech switch in casing 290 are at present connected together. Thus one brush of the motor armature is directly connected via lines O and W to the lowest brush on the drum while the middle brush on the drum is connected by line G to the other brush of the motor armature. The armature is therefore short-circuited, and as the shunt field is still energised the armature is stopped almost instantly the drum 235 breaks contact and the motor is disconnected.

Thus the drums have all moved back to the positions shown in Figure 23 and the cycle is completed and the gun is ready for the next round. This, as previously explained, should be already in the receiver 30 and the whole cycle will repeat immediately the tray reaches the firing position if the switch striker 31 has been pressed as previously mentioned.

*Firing mechanism*

Figure 24:
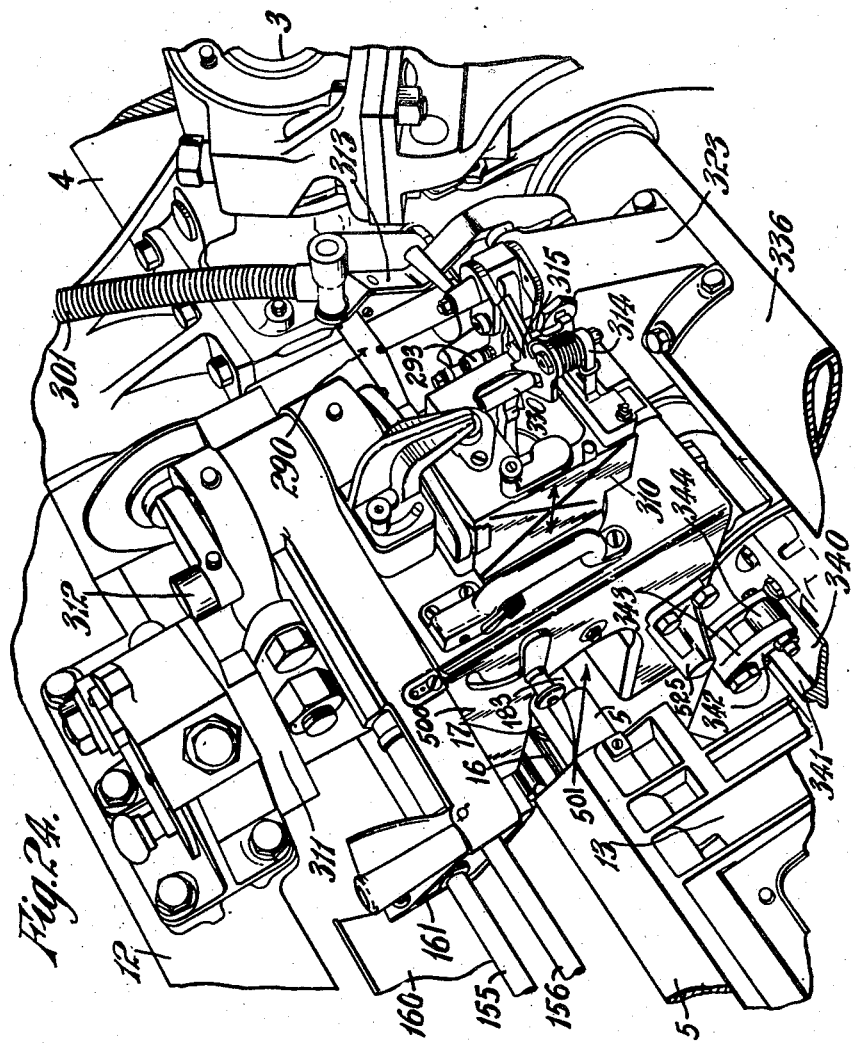
Figure 24 is a perspective view of the breech of the gun with the breech-block open.
Figure 35:
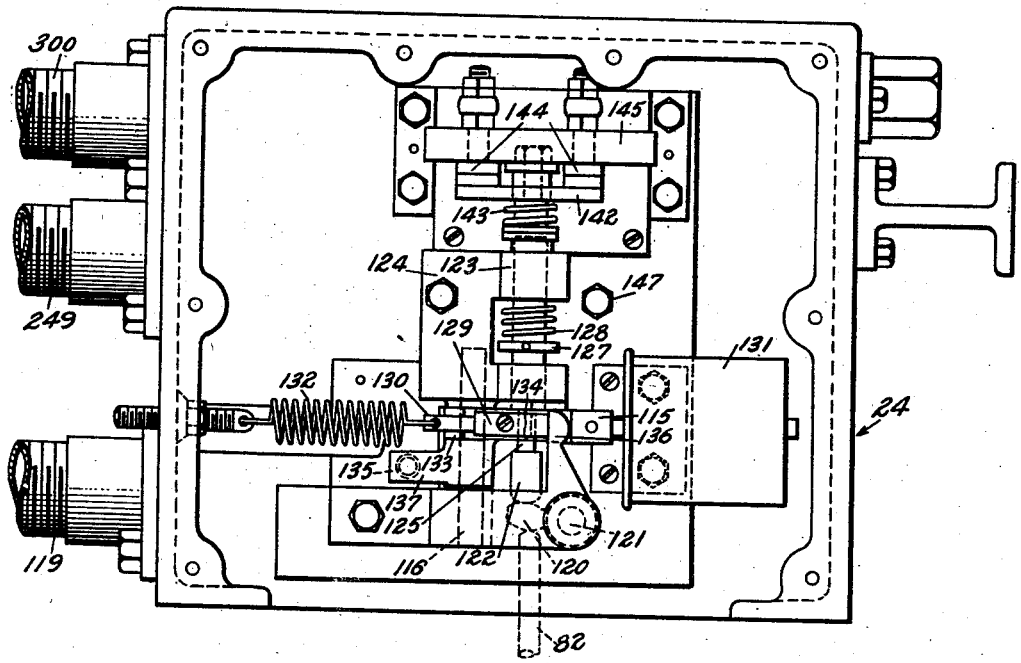
Figure 35 is a plan view of the main switch box shown in Figure 6, the wiring being omitted.
Figure 36:
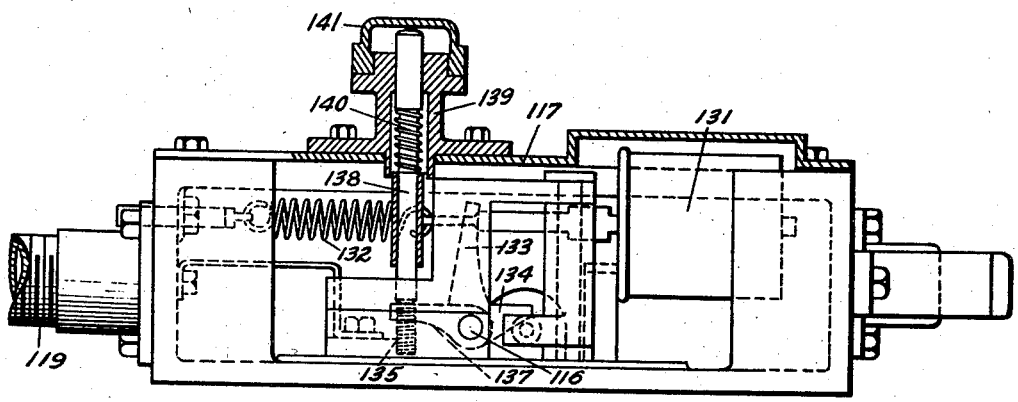
Figure 36 is a front elevation of Figure 35 showing the cover of Figure 7 in position and partly in section.

The arrangements for automatically firing the gun as soon as the breech is closed depend on the construction of the particular gun concerned, but by way of example, a description will be given of the devices necessary to enable the British Q. F.-3.7 inch Mark II or III gun to be automatically fired. Figure 24 shows a perspective view of the breech of such a gun with the breech-block open provided with automatic firing devices according to the invention, but the said devices will be better understood from Figures 25 and 26. In Figure 24, the breech-ring 500 has a horizontally disposed opening 501 through which the round is passed, first laterally as the tray 5 swings to the loading position, and then endwise during ramming.

In the normal construction the gun is provided with a horizontally sliding breech-block 310 (as indicated by the double-headed arrow in Figure 24) which is opened by a cam device 311 fixed to the counterweight beam 12, which engages a roller 312 on a lever 550 fixed on an actuating shaft 551 (Figure 41) and causes the shaft 551 to rotate in an anti-clockwise direction. A crank 552 fixed to the actuating shaft 551 has attached thereto a sliding block 553 arranged to slide in a groove 554 in the upper face of the breech-block 310 and anti-clockwise rotation of the shaft 551 causes the sliding block 553 to carry the breech-block 310 into the fully opened position. The cartridge case is automatically extracted as the breech opens, and the breech-block is retained in the open position by the breech-retaining catches 503 (Figure 40).

A rack pinion 555 fixed to the actuating shaft 551 is also rotated with the latter and forces a rack 556 against a breech-closing spring 557 to compress it.

A shaft 558 has at its upper end a retracting crank 559 carrying a roller 560 arranged to engage the sliding block 553, while at its lower end the shaft has a cocking crank 561 carrying a roller 562 which runs in an inclined recess 566 in the breech-ring.

The shaft 558 carries a double-armed cocking lever 330 one arm having a T shaped end (at its right-hand extremity in Figure 41) which extends through an aperture in the breech-block 310, and being recessed to hold a spring plunger 564 which bears against a suitable surface in a part of the breech-block and tends by the action of its spring to rotate the cocking lever 330 in a clockwise direction. The end of the inner arm 563 of the cocking lever 330 is adapted to engage a lug 565 on a firing device to be described later.

Anti-clockwise rotation of the actuating shaft 551 during runout causes the breech-block 310 to be moved by the sliding block 553 to the open position. Just prior to this, during the initial anti-clockwise movement of the shaft 551, the sliding block 553 engages the roller 560 and rotates the crank 559, shaft 558 and arm 563 in an anti-clockwise direction so as to withdraw the firing pin from the round. The groove 554 is so shaped that for the initial anti-clockwise movement of the arm 552 the breech-block is not moved until such time as the roller 560 has moved through the required distance to withdraw the firing pin from the round and continued movement of the arm 552 will open the breech. The rotation of the cocking lever is continued by the action of the roller 562 riding on the inclined recess 566 in the breech-ring as the breech-block opens and thereby rotating the cocking crank 561 which rotates the cocking-lever 330 still further, at the same time compressing the spring of the plunger 564.

The firing device comprises a firing case 567 fitted inside the breech-block 310, and containing a striker 568, striker-spring 569, and firing pin 570. The striker 568 is adapted to be cocked by engagement of the inner arm 563 of the cocking lever 330 with a lug 565 on the striker during anti-clockwise rotation of the cocking lever during the opening of the breech. The firing pin as has been stated has been withdrawn prior to the movement of the breech-block, and the continued anti-clockwise movement of the arm 563 moves back the striker so as to cock it by compressing the spring 569. One arm 571 (see Figure 42) of a sear pivoted at 572 is pressed by a spring urged plunger 573 into a recess in the striker 568 when the latter is cocked and holds it in the cocked position. The other arm 574 of the sear is adapted to be engaged and forced upwardly in Figure 42 by a firing plunger 575 so as to move the arm 571 out of the recess and so release the striker 568 when it is desired to fire a round.

A catch 576 retains the firing case 567 in position within the breech-block 310.

When the breech-block is returned to the closed position, the cocking lever 330 is rotated in a clockwise direction into the firing position by pressure of the spring plunger 564, and the arm 563 of the cocking lever is thus moved away from the lug 565 on the striker 568 which, however, is held in the cocked position by the arm 571 of the sear.

When the breech-block is home, a hand lever 313 is operated which depresses a firing lever plunger 333, Figures 25 and 41, which releases the striker through a series of levers about to be described. The hand lever 313 is pivoted at 577 (Figure 41) and is arranged to engage one end of a push-rod 305 connected to one arm 328 of a bell-crank lever pivoted at 578, whose other arm 332 engages the firing lever plunger 333. The latter is slotted to receive one arm 579 of a further lever pivoted at 580, whose other arm carries a roller 581. This roller engages the upper surface of an arm 582 of another lever which is pivoted on a pin 583 and whose other arm 584 carries a roller 585 which engages the lower end of the firing plunger 575. When the hand lever 313 is moved anti-clockwise, Figures 24, 25 and 41, the push rod 305 is moved and actuates the bell-crank lever, whose arm 332 pushes the firing lever plunger 333, thus actuating the two levers 579—580 and 582—584. The arm 584 of the last-mentioned lever pushes up the firing plunger 575 which strikes the arm 574 of the sear, thus releasing the striker 568 which, with the firing pin, flies forwardly under the action of the striker spring 569.

It is to be understood that the construction of breech-block and firing mechanism shown in Figures 41 and 42 is the construction of these parts as on the existing guns before having the present invention applied thereto. Further reference to the hand lever and its associated parts will be made later, because the gun when modified in accordance with the present invention is adapted to fire automatically or if desired by hand using the lever 313 and setting a cam 331 as described later with reference to Figure 26.

When an existing gun of this type is to be automatically fired it is found that the firing plunger is sometimes actuated and the striker released before the cocking lever has reached the firing position, so that the operative end of the cocking lever is not entirely clear of the lug 565 on the striker 568. Under these circumstances the forward movement of the striker 568 and firing pin 570 is sometimes checked by impact against said lever and in consequence the cap of the cartridge is not always struck with sufficient force to cause the round to fire.

The constructions described herein and shown in the accompanying drawings other than Figures 41 and 42 overcome this disadvantage.

In the construction shown in Figures 24–26, a bracket 314 is fixed on the rear end of the sliding breech block 310 which is remote from the breech (see Figure 24). A lever 315 is pivoted at 318 to said bracket and is provided with a slot or fork 316 which engages the T-shaped end of the existing cocking lever 330, on the type of gun being described, so that oscillation of the forked lever on its pivot causes the cocking lever to oscillate on the shaft 558 within the breech block. A projecting arm 319 extends from one side of the forked lever and the end 320 thereof constitutes an abutment whereby the lever may be moved around its pivot when said abutment is pressed. The lever is provided with a torsion spring 317 for a purpose explained later when the action is discussed.

As may be seen from Figures 24, 25 and 41, the T-shaped end of the cocking lever 330 swings from side to side. In Figure 24 it is to the right hand side, that is in the fully cocked position, and in Figure 25 it is over to the left, that is in the firing position, and its inner arm 563 (Figure 41) is out of engagement with the lug 565, thus leaving the striker free to move forward. Thus until the cocking lever 330 reaches the firing position it can prevent the full free striking movement of the firing pin.

A double-armed lever 321 is pivoted at 322 on a fixed part of the gun, that is a part not subject to the recoil movement. For this purpose a bracket 323 is fixed to a cylindrical member 336, Figure 24, similar to the member 6 previously referred to, and the pivot pin 322 is fixed in a forked member 337 attached to the top of said bracket. The forked member 337 has a forked lug 524 extending therefrom in which the arm 292 is housed and by which it is fixed to the box 290 for a reinforcement. On one end of the lever 321 there is adjustably fixed a block or abutment 324 capable of engaging the abutment 320 formed on the extension arm of the slotted lever 315. The end of the double-armed lever 321 adjacent said block is so shaped and dimensioned that it can engage the end of the sliding breech-block 310 at certain times. In existing guns the breech-block 310 is not long enough to permit this, so the pivot bracket above referred to may be provided with an extension or lug (not shown) on its base to increase the effective length of the breech-block 310. Between the pivot 322 and the operative end of the double armed lever 321 the latter is provided with a convex pressure face 326 adapted to engage a similar face 327 formed on one arm 328 of a bell-crank lever which is pivoted at 329 on a fixed part of the gun, viz, a forked bracket 325 fixed to the bracket 323. The other arm 332 of this lever is adapted to co-operate with the firing lever plunger 333 previously referred to.

A spring loaded plunger 334, Figure 26, under the action of the spring 335 presses on the double-armed lever 321 at the side opposite to that on which the convex pressure face 326 is located.

Figure 24 also shows the mechanical interlock device mentioned previously in the description of the loading tray. A member 340 attached to the rocking bracket 13 of the tray has an upstanding tapering rib 341 capable of entering a groove 342 in a lever 343 having a roller 344 (see also Figure 41). When the cam lever 343 straddles the rib as in Figure 24, the loading tray is in the firing position and the usual locking bolt 586 (Figure 41) coupled to the lever 343 is withdrawn so that the breech-block can close and when recoil and run-out take place the lever runs lengthwise of the rib 341. When the tray is in the loading position the roller 344 is situated on top of the rib and therefore the lever is rocked and the bolt engages the breech-block 310 and prevents it from closing.

The mechanism operates in the following manner:—Assuming a round has just been fired, the gun recoils and on the run-out the firing pin is withdrawn, the breech opens, the firing pin is cocked, the case is ejected and the breech operating spring is loaded, all in the manner described. The movement of the cocking lever 330 rotates the slotted lever 315 as the breech opens on the run-out and the spring 317 rotates the slotted lever in an anti-clockwise direction as seen in Figure 25 so that it is urged against the cocking lever 330, whereby, the end 320 of the slotted lever 315 is clear of the abutment 324 when the breech-block 310 closes and the cocking lever is in the firing position. As the new round is rammed home the breech-block 310 closes provided that the loading tray has been moved away from the loading position so that the breech locking bolt is withdrawn. Just prior to the final closing of the breech the T end of the cocking lever 330 occupies such a position that owing to its engagement in the fork of the slotted lever 315 the abutment 320 on the extension arm of the latter is aligned ready to engage the block or abutment 324 on the double-armed lever. As the breech-block 310 moves over the last fraction of its closing stroke the end of the double-armed lever 321 slips past it under the pressure of the spring plunger 334 and, pressure is exerted which tends to move the slotted lever on its pivot and consequently presses against the end of the cocking lever. When the cocking lever has moved to the firing position, that is, far enough to ensure that the end of its arm 563 is clear of the lug 565, the abutment 320 will be clear of the block 324 at the end of the double arm lever so that the convex pressure face 326 on the double-armed lever can then engage the similar face 327 on the bell crank lever. Thus only after the cocking lever has moved the necessary distance, that is to firing position, is the firing plunger 333 operated to release the striker and fire the gun.

Recoil follows immediately, the bracket, slotted lever 315 and cocking lever 330 all moving with the gun barrel while the double-armed lever 321, spring plunger 335 and bell crank lever 328—332 remain still. A stop described later is provided to arrest further movement of the double-armed lever 321 while recoil is taking place, and on the run-out the breech-block, as it opens, strikes the operative end of the double-armed lever 321 and once more loads the spring plunger 334, the lever 321 being held again by the breech-block, as the breech is opened by the cam and roller device above referred to.

In Figure 26 there is shown a cam 331 which forms a stop for the double-armed lever 321 and is provided with an operating handle 338 the boss of which is formed to constitute a pointer. The forked member 337 has lines H and A on it corresponding to "hand" and "automatic," and when the handle is moved so that the pointer is in line with the mark H, the lever 321 ceases to function. The gun may then be hand fired by pulling the handle 313 to the left, Figure 25. This movement moves the push rod 305 to the left and operates the firing plunger directly through the bell crank lever 328—332 in the manner described.

In the modified form of firing mechanism shown in Figures 27 and 28, some parts are identical in shape and function to those shown in Figures 25 and 26 and bear the same references. Referring to these views, a bracket 345 is fixed to a part 346 of the gun cradle and supports a tube 347 in which is mounted a shaft 348. On the lower end of this shaft as viewed in Figure 27 there is fixed a lever 349 which has a roller 350 at its free end and has another portion 351 forming an abutment or the equivalent of a separate lever. The other end of the shaft has fixed thereto a lever 352 which is pivoted at 353, Figure 28, to the end of a link 354 by means of a universal joint as shown. The other end of this rod is similarly connected at 355 to a lever 356 fixed at the lower end of a shaft 357 which is journalled in a tube 358 fixed to a base plate 359 which is secured to the bracket 323. The upper end of the shaft 357 has fixed thereto a short lever 360 furnished with two upstanding cheeks 361 in which set-screws are provided for the purpose of adjustment. Another lever 362 is freely mounted on the shaft 357 and held between the two set-screws so that it is in effect rigidly attached to the shaft 357 and shares its movements. The free end of the lever 362 is provided with a small abutment 363 which engages with a similarly shaped piece 364 formed on a plunger 365 movable in a spring housing or tube 366. Inside the tube there is housed a compression spring 367, interposed between the plunger 365 and the bottom of the tube, so that as the lever 362 moves downwardly as viewed in Figure 27, the spring housing 366 also will be moved downwardly under resilient pressure due to the spring 367. The other end of the tube is shaped into a flat portion 368 which is pivoted at 369 to the double armed lever 321$^1$ which engages the abutment on the slotted lever as described and shown in Figure 25. A short link 370 is also connected to the pivot 369 and its other end is pivoted at 371 to a bell crank lever 372 which is pivoted in the base plate 359 at 373. One arm of the bell crank lever 372 has attached thereto a link 374 the other end of which is connected to the firing lever 313 which is not shown on the drawings but is located at a position different from that shown in Figure 25. The flat face 372$^1$ of the bell crank lever 372 operates the firing lever plunger 333 in the manner previously described with reference to Figure 25. In Figure 27 there is also shown a plate 375 which is supported from the main base plate 359 by two angle pieces 376 and a side strip 377, Figure 28. This plate is used to support the breech switch casing 290 in a similar manner to that shown in Figure 25.

Referring to Figure 28, it will be seen that the roller 350 at the end of the lever 349 is in engagement with a short flat surface shown by the dotted line 378 which joins a further surface shown by a curved dotted line 379 concentric with the axis upon which the loading tray rotates. The abutment or arm 351 of the lever is shown in engagement with a stop shown in Figure 28 as a dotted line 380 which is radial to such axis. These various surfaces 378, 379 and 380 represent projections or abutments formed on the extreme end of the loading tray bracket 13 and are more clearly seen in Figure 39. It will be seen that when the parts are in the position shown in Figure 28 the link 354 cannot move to the right (because the abutment 351 is pressing against the surface 380). If, however, the loading tray 5 is rocked in the direction of the arrow, that is, towards the loading position, the roller 350 rides up the surface represented by the straight dotted line 378 and the abutment 351 becomes disengaged from the surface represented by the radial dotted line 380 and during continued movement of the loading tray 5 the roller 350 merely runs over the surface represented by the concentric dotted line 379.

In order to actuate the double-armed lever 321$^1$ (equivalent to 321 in Figures 25 and 26) so that the gun will fire, it is necessary for the spring tube 366 to move downward as viewed in Figure 27, and as explained above, when the tray is moving in the direction of the arrow in Figure 28 there is no movement of the tube beyond the initial reverse movement of the tube to its inoperative position. When the round has been rammed and the tray is swung back to the firing position, the abutment 351 is engaged by the surface corresponding to the radial dotted line 380 and this causes the link 354 to move to the left and consequently the lever 362 moves downward as viewed in Figure 27 and presses on the plunger of the spring tube which thereupon causes the double-armed lever 321¹ to operate in the manner previously described with reference to Figure 25. When, however, the tray is swung back with the breech open the spring 367 is merely compressed, since the arm 321¹ will be held back by the breech-block. By this construction the firing rate of the gun can be increased and, what is more important, the dead time period also decreased and made, in normal practice, independent of the time of closing the breech, because as soon as the tray is back to a safe position, the gun fires, whereas in the previous example the mechanical interlock to the breech (which is not used in the present example) was released by the tray after the tray was back and then the breech had to close before firing took place.

The operation of the mechanism is described in the section headed "Circuit and operation" and this discloses everything that occurs up to the closing of the breech-block 310. In the section headed "Firing mechanism" there are described various mechanical devices for controlling the fire, which according to the adjustment made to the cam 331 may be "hand" or "automatic," and this final mechanism when automatic performs operation (f) of the cycle described in the section "Circuit and operation."

What we claim as our invention and desire to secure by Letters Patent is:

1. A gun comprising in combination a breech, a loading tray movable between a loading position and a firing position, in which latter position the tray is bodily offset from the breech so that it is out of the way of the latter during recoil and is properly positioned to receive a round, means for closing said breech automatically on the insertion of a round therein, firing mechanism for the gun, fuze-setting means adapted to set the fuze of a round in the loading tray, means for automatically actuating the fuze-setting means and the loading tray in timed relationship so that the fuze of the round is already set when the tray is in the loading position, a rammer-device, means operably controlled in timed relationship with the movement of the loading tray automatically to actuate the rammer-device and ram the round into the breech, and means associated with the breech to actuate the firing mechanism automatically when the breech is closed, whereby there is provided an automatic setting-loading-firing cycle giving a substantially constant dead-time for each round.

2. A gun comprising in combination a breech, a loading tray movable between a loading position and a firing position, in which latter position the tray is bodily offset from the breech so that it is out of the way of the latter during recoil and is properly positioned to receive a round, means for closing said breech automatically on the insertion of a round therein, a firing mechanism including a firing pin, a cocking lever which is adapted to cock the firing pin and which is adapted to be moved to a firing position clear of the firing pin after the breech is closed, a fuze-setter comprising fuze-setting elements having relative movement lengthwise with respect to a round in the tray to engage and set a movable fuze-element of the round and then to separate the setting elements from the fuze-element, means for actuating said fuze-setter and thereafter in timed relationship moving said loading tray from the firing position into the loading position, a rammer-device, means operably controlled in timed relationship with said actuating means to operate said rammer-device and ram a round into the breech and thereafter to return the tray automatically to the firing position, and means operably controlled by at least one of said tray-return means and breech-closing means automatically to actuate the firing mechanism only when the cocking lever is in the firing position.

3. A gun comprising in combination a breech, a loading tray movable between a loading position and a firing position, in which latter position the tray is bodily offset from the breech so that it is out of the way of the latter during recoil and is properly positioned to receive a round, means for closing said breech automatically on the insertion of a round therein, a firing mechanism including a firing pin, a cocking lever which is adapted to cock the firing pin and which is adapted to be moved to a firing position clear of the firing pin after the breech is closed, a fuze-setter comprising fuze-setting elements having relative movement lengthwise with respect to a round in the tray to engage and set a movable fuze-element of the round and then to separate the setting elements from the fuze-element, means for actuating said fuze-setter and thereafter in timed relationship moving said loading tray from the firing position into the loading position, a rammer-device, means operably controlled in timed relationship with said actuating means to operate said rammer-device and ram a round into the breech and thereafter to return the tray automatically to the firing position, and means operably controlled by at least one of said tray-return means and breech-closing means automatically to actuate the firing mechanism, said last-named means including a firing plunger, a pressure-device to actuate the firing-plunger, and an intermediate member which is operably connected to the cocking lever and through which the pressure device operates on the firing plunger, whereby the intermediate member prevents actuation of the firing plunger by said pressure-device until the cocking lever is in the firing position.

4. A gun comprising in combination a breech, a loading tray movable between a loading position and a firing position, in which latter position the tray is bodily offset from the breech so that it is out of the way of the latter during recoil and is properly positioned to receive a round, an electric motor to drive the loading tray, means for closing said breech automatically on the insertion of a round therein, firing mechanism for the gun, fuze-setting means adapted to set the fuze of a round in the loading-tray, an electric motor for automatically actuating the fuze-setting means in timed relationship with the loading tray so that the fuze of the round is already set when the loading tray is in the loading position, a rammer-device, an electric motor for driving the latter in timed relationship with the movement of the loading tray automatically to ram the round into the breech, circuits for said motors comprising a main switch to start the first motor and contact timing devices driven in timed relationship with the shafts of said motors to control said circuits, whereby the motors are controlled and brought into operation in the desired time sequence after the first motor is started by the main switch, and means associated with the breech to actuate the firing mechanism automatically when the breech is closed, whereby there is provided an automatic setting-loading-firing cycle giving a substantially constant dead-time for each round.

5. A gun comprising in combination a breech, a loading tray movable between a loading position and a firing position, in which latter position the tray is bodily offset from the breech so that it is out of the way of the latter during recoil and is properly positioned to receive a round, an electric motor to drive the loading tray, means for closing said breech automatically on the insertion of a round therein, firing mechanism for the gun, fuze-setting means adapted to set the fuze of a round in the loading-tray, an electric motor for automatically actuating the fuze-setting means in timed relationship with the loading tray so that the fuze of the round is already set when the loading tray is in the loading position, a rammer-device, an electric motor for driving the latter in timed relationship with the movement of the loading tray automatically to ram the round into the breech, circuits for said motors comprising a main switch to start the first motor and rotary and cam-operated timing switches driven in timed relationship with the shafts of said motors to control said circuits, whereby the motors are controlled and brought into operation in the desired time sequence after the first motor is started by the main switch, and means associated with the breech to actuate the firing mechanism automatically when the breech is closed, whereby there is provided an automatic setting-loading-firing cycle giving a substantially constant dead-time for each round.

6. A gun comprising in combination a breech, a loading tray movable between a loading position and a firing position, in which latter position the tray is bodily offset from the breech so that it is out of the way of the latter during recoil and is properly positioned to receive a round, an electric motor to drive the loading tray, means for closing said breech automatically on the insertion of a round therein, firing mechanism including a firing-pin and a cocking-lever which is adapted to cock the firing-pin and which is adapted to be moved into a firing position clear of the firing pin after the breech is closed, a fuze-setter having fuze-setting elements, an electric motor for automatically actuating the fuze-setter in timed relationship with the loading tray so that the fuze of the round is already set when the loading tray is in the loading position, said fuze-setting elements having relative movement and lengthwise with respect to a round in the tray to engage and set a movable fuze-element of the round and then to separate the setting elements and the fuze-element and said tray thereafter moving from the firing position into the loading position, a rammer-device, an electric motor for driving the latter in timed relationship with the movement of the loading tray automatically to ram the round into the breech, the tray being thereafter automatically returned by its motor to the firing position, circuits for said motors comprising a main switch to start the first motor and contact timing devices driven in timed relationship with the shafts of said motors to control said circuits, whereby the motors are controlled and brought into operation in the desired time sequence after the first motor is started by the main switch, and means operably controlled by at least one of said tray-return means and breech-closing means automatically to actuate the firing mechanism only when the cocking lever is in the firing position.

7. A gun comprising in combination a breech, a loading tray movable between a loading position and a firing position, in which latter position the tray is bodily offset from the breech so that it is out of the way of the latter during recoil and is properly positioned to receive a round, an electric motor to drive the loading tray, means for closing said breech automatically on the insertion of a round therein, firing mechanism including a firing-pin and a cocking-lever which is adapted to cock the firing-pin and which is adapted to be moved into a firing position clear of the firing pin after the breech is closed, a fuze-setter having fuze-setting elements, an electric motor for automatically actuating the fuze-setter in timed relationship with the loading tray so that the fuze of the round is already set when the loading tray is in the loading position, said elements having relative lengthwise movement with respect to a round in the tray to engage and set a movable fuze-element of the round and then to separate the setting elements from the fuze-element and said tray thereafter moving from the firing position into the loading position, a rammer-device, an electric motor for driving the latter in timed relationship with the movement of the loading tray automatically to ram the round into the breech, said tray being thereafter automatically returned by its motor to the firing position, circuits for said motors comprising a main switch to start the first motor and rotary and cam-operated timing switches driven in timed relationship with the shafts of said motors to control said circuits, whereby the motors are controlled and brought into operation in the desired time sequence after the first motor is started by the main switch, and means operably controlled by at least one of said tray-return means and breech-closing means automatically to actuate the firing mechanism only when the cocking lever is in the firing position.

8. A gun comprising in combination a breech, a loading tray movable between a loading position and a firing position, in which latter position the tray is bodily offset from the breech so that it is out of the way of the latter during recoil and is properly positioned to receive a round, an electric motor to drive the loading tray, means for closing said breech automatically on the insertion of a round therein, firing mechanism for the gun, fuze-setting means adapted to set the fuze of a round in the loading-tray, an electric motor for automatically actuating the fuze-setting means in timed relationship with the loading tray so that the fuze of the round is already set when the loading tray is in the loading position, a rammer-device, an electric motor for driving the latter in timed relationship with the movement of the loading tray automatically to ram the round into the breech, circuits for said motors comprising a main switch to start the first motor and contact timing devices driven in timed relationship with the shafts of said motors to control said circuits, whereby the motors are controlled and brought into operation in the desired time sequence after the first motor is started by the main switch, means associated with the breech to actuate the firing mechanism automatically when the breech is closed, whereby there is provided an automatic setting-loading-firing cycle giving a substantially constant dead-time for each round, and means operable by actuation of said main switch after one fuze-setting cycle of a complete setting-loading-firing cycle is completed and on return of said tray to firing position for initiating a new setting-loading-firing cycle which overlaps the preceding setting-loading-firing cycle.

9. A gun comprising in combination a breech, a loading tray movable between a loading position and a firing position, in which latter position the tray is bodily offset from the breech so that it is out of the way of the latter during recoil and is properly positioned to receive a round, an electric motor to drive the loading tray, means for closing said breech automatically on the insertion of a round therein, firing mechanism for the gun, fuze-setting means adapted to set the fuze of a round in the loading-tray, an electric motor for automatically actuating the fuze-setting means in timed relationship with the movement of the loading-tray so that the fuze of a round is already set when the loading tray is in the loading position, a rammer-device, an electric motor for driving the latter in timed relationship with the movement of the loading tray automatically to ram the round into the breech, circuits for said motors comprising a main switch to start the first motor and rotary and cam-operated timing switches driven in timed relationship with the shafts of said motors to control said circuits, whereby the motors are controlled and brought into operation in the desired time sequence after the first motor is started by the main switch, means associated with the breech to actuate the firing mechanism automatically when the breech is closed, whereby there is provided an automatic setting-loading-firing cycle giving a substantially constant dead-time for each round, and means operable by actuation of said main switch after one fuze-setting cycle of a complete setting-loading-firing cycle is completed and on return of said tray to firing position for initiating a new setting-loading-firing cycle which overlaps the preceding setting-loading-firing cycle.

10. A gun comprising in combination a breech, a loading tray movable between a loading position and a firing position, in which latter position the tray is bodily offset from the breech so that it is out of the way of the latter during recoil and is properly positioned to receive a round, an electric motor to drive the loading tray, means for closing said breech automatically on the insertion of a round therein, firing mechanism including a firing-pin and a cocking-lever which is adapted to cock the firing-pin and which is adapted to be moved into a firing position clear of the firing pin after the breech is closed, a fuze-setter having fuze-setting elements, an electric motor for automatically actuating the fuze-setter in timed relationship with the loading tray so that the fuze of the round is already set when the loading tray is in the loading position, said fuze-setting elements having relative movement lengthwise with respect to a round in the tray to engage and set a movable fuze-element of the round and then to separate the setting elements from the fuze-element and said tray thereafter moving from the firing position into the loading position, a rammer-device, an electric motor for driving the latter in timed relationship with the movement of the loading tray automatically to ram the round into the breech, said tray being thereafter automatically returned to the firing position, circuits for said motors comprising a main switch to start the first motor and contact timing devices driven in timed relationship with the shafts of said motors to control said circuits, whereby the motors are controlled and brought into operation in the desired time sequence after the first motor is started by the main switch, means operably controlled by at least one of the tray-return means and breech-closing means automatically to actuate the firing mechanism only when the cocking lever is in the firing position, and means operable by actuation of said main switch after one fuze-setting cycle of a complete setting-loading-firing cycle is completed and on return of said tray to firing position for initiating a new setting-loading-firing cycle which overlaps the preceding setting-loading-firing cycle.

11. A gun comprising in combination a breech, a loading tray movable between a loading position and a firing position, in which latter position the tray is bodily offset from the breech so that it is out of the way of the latter during recoil and is properly positioned to receive a round, an electric motor to drive the loading tray, means for closing said breech automatically on the insertion of a round therein, firing mechanism for the gun, fuze-setting means adapted to set the fuze of a round in the loading-tray, an electric motor for automatically actuating the fuze-setting means in timed relationship with the loading tray so that the fuze of the round is already set when the loading tray is in the loading position, a rammer-device, an electric motor for driving the latter in timed relationship with the movement of the loading tray automatically to ram the round into the breech, circuits for said motors comprising a main switch to start the first motor and contact timing devices driven in timed relationship with the shafts of said motors to control said circuits, whereby the motors are controlled and brought into operation in the desired time sequence after the first motor is started by the main switch, a time-control device whereby said main switch can be automatically broken after a predetermined time to prevent damage to the motors and wastage of current, and means associated with the breech to actuate the firing mechanism automatically when the breech is closed, whereby there is provided an automatic setting-loading-firing cycle giving a substantially constant dead-time for each round.

12. A gun comprising in combination a breech, a loading tray movable between a loading position and a firing position, in which latter position the tray is bodily offset from the breech so that it is out of the way of the latter during recoil and is properly positioned to receive a round, an electric motor to drive the loading tray, means for closing said breech automatically on the insertion of a round therein, firing mechanism for the gun, fuze-setting means adapted to set the fuze of a round in the loading-tray, an electric motor for automatically actuating the fuze-setting means in timed relationship with the loading tray so that the fuze of the round is already set when the loading tray is in the loading position, a rammer-device, an electric motor for driving the latter in timed relationship with the movement of the loading tray automatically to ram the round into the breech, circuits for said motors comprising a main switch to start the first motor and contact timing devices driven in timed relationship with the shafts of said motors to control said circuits, whereby the motors are controlled and brought into operation in the desired time sequence after the first motor is started by the main switch, a round receiving device for supplying a round to the loading tray when the latter is in the firing position, means controlled by said main-switch for effecting delivery of a round to the loading tray, said switch-controlled means being operable only when the loading tray has returned to the firing position, means associated with the breech to actuate the firing mechanism automatically when the breech is closed, whereby there is provided an automatic setting-loading-firing cycle giving a substantially constant dead-time for each round, and means operable by actuation of said main switch after one fuze-setting cycle of a complete setting-loading-firing cycle is completed and on return of said tray to firing position for initiating a new setting-loading-firing cycle which overlaps the preceding setting-loading-firing cycle.

13. A gun comprising in combination a breech, a loading tray movable between a loading position and a firing position, in which latter position the tray is bodily offset from the breech so that it is out of the way of the latter during recoil and is properly positioned to receive a round, an electric motor to drive the loading tray, means for closing said breech automatically on the insertion of a round therein, firing mechanism including a firing-pin and a cocking-lever which is adapted to cock the firing-pin and which is adapted to be moved into a firing position clear of the firing pin after the breech is closed, a fuze-setter having fuze-setting elements, an electric motor for automatically actuating the fuze-setter in timed relationship with the loading tray so that the fuze of the round is already set when the loading tray is in the loading position, said elements having relative movement lengthwise with respect to a round in the tray to engage and set a movable fuze-element of the round and then to separate the setting elements from the fuze-elements and said tray thereafter moving from the firing position into the loading position, a rammer-device, an electric motor for driving the latter in timed relationship with the movement of the loading tray automatically to ram the round into the breech, said tray being thereafter automatically returned to the firing position, circuits for said motors comprising a main switch to start the first motor and contact timing devices driven in timed relationship with the shafts of said motors to control said circuits, whereby the motors are controlled and brought into operation in the desired time sequence after the first motor is started by the main switch, and means operably controlled by at least one of the tray-return means and breech-closing means automatically to actuate the firing mechanism and including a firing plunger, a pressure-device to actuate the firing plunger, and control-means movable to an actuating position in which the pressure-device can be caused to operate the firing plunger, said control-means being movable to its actuating position as the cocking lever moves to its firing position whereby the firing plunger can be actuated only when the cocking lever is in the firing position.

14. A gun comprising in combination a breech, a loading tray movable between a loading position and a firing position, in which latter position the tray is bodily offset from the breech so that it is out of the way of the latter during recoil and is properly positioned to receive a round, an electric motor to drive the loading tray, means for closing said breech automatically on the insertion of a round therein, firing mechanism including a firing-pin and a cocking-lever which is adapted to cock the firing-pin and which is adapted to be moved into a firing position clear of the firing pin after the breech is closed, a fuze-setter having fuze-setting elements, an electric motor for automatically actuating the fuze-setter in timed relationship with the loading tray so that the fuze of the round is already set when the loading tray is in the loading position, said elements having relative movement lengthwise with respect to a round in the tray to engage and set a movable fuze-element of the round and then to separate the setting elements from the fuze-element and said tray thereafter moving from the firing position into the loading position, a rammer-device, an electric motor for driving the latter in timed relationship with the movement of the loading tray automatically to ram the round into the breech, said tray being thereafter automatically returned to the firing position, circuits for said motors comprising a main switch to start the first motor and contact timing devices driven in timed relationship with the shafts of said motors to control said circuits, whereby the motors are controlled and brought into operation in the desired time sequence after the first motor is started by the main switch, and means operably controlled by at least one of the tray-return means and breech-closing means automatically to actuate the firing mechanism and including a firing plunger, a pressure-device to actuate the firing-plunger, and an intermediate member which is operably connected to the cocking lever and through which the pressure-device operates on the firing plunger, said intermediate member preventing actuation of the firing plunger by said pressure-device until the cocking lever is in the firing position.

15. A gun comprising in combination a breech, a loading tray movable between a loading position and a firing position, in which latter position the tray is bodily offset from the breech so that it is out of the way of the latter during recoil and is properly positioned to receive a round, means for closing said breech automatically on the insertion of a round therein, firing mechanism for the gun, fuze-setting means adapted to set the fuze of a round in the loading tray, means for automatically actuating the fuze-setting means and the loading tray in timed relationship so that the fuze of the round is already set when the tray is in the loading position, a rammer-device, means operably controlled in timed relationship with the movement of the loading tray to actuate the rammer-device and automatically to ram the round into the breech, and means associated with the breech to actuate the firing mechanism automatically when the breech is closed, said last-named means comprising a spring adapted to be loaded by the breech-block during run-out and to be released by the movement of the breech-block as the latter completes its closing movement, whereby there is provided an automatic setting-loading-firing cycle giving a substantially constant dead-time for each round.

16. A gun comprising in combination a breech, a loading tray movable between a loading position and a firing position, in which latter position the tray is bodily offset from the breech so that it is out of the way of the latter during recoil and is properly positioned to receive a round, means for closing the breech automatically on the insertion of a round therein, a firing mechanism including a firing pin and a cocking lever which is adapted to cock the firing pin and which is adapted to be moved to a firing position clear of the firing pin after the breech is closed, a fuzesetter comprising fuze-setting elements having relative movement lengthwise with respect to a round in the tray to engage and set a movable fuze-element of the round and then to separate the setting elements from the fuze-element, means for actuating the fuze-setter and thereafter in timed relationship the loading tray to move the latter from the firing position into the loading position, a rammer-device operably controlled in timed relationship with said actuating means to ram a round into the breech, means to actuate the rammer and thereafter to return the tray automatically to the firing position, and means operably controlled by at least one of the tray-return means and breech-closing means automatically to actuate the firing mechanism only when the cocking lever is in the firing position, said last-named means comprising a spring adapted to be loaded by the breech-block during run-out and to be released by the movement of the breech-block as the latter completes its closing movement.

17. A gun comprising in combination a breech, a loading tray movable between a loading position and a firing position, in which latter position the tray is bodily offset from the breech so that it is out of the way of the latter during recoil and is properly positioned to receive a round, an electric motor to drive the loading tray, means for closing said breech automatically on the insertion of a round therein, firing mechanism including a firing-pin and a cocking-lever which is adapted to cock the firing-pin and which is adapted to be moved into a firing position clear of the firing pin after the breech is closed, a fuze-setter having fuze-setting elements, an electric motor for automatically actuating the fuze-setter in timed relationship with the loading tray so that the fuze of the round is already set when the loading tray is in the loading position, said elements having relative movement lengthwise with respect to a round in the tray to engage and set a movable fuze-element of the round and then to separate the setting elements from the fuze-elements and said tray thereafter moving from the firing position into the loading position, a rammer-device, an electric motor for driving the latter in timed relationship with the movement of the loading tray automatically to ram the round into the breech, said tray being thereafter automatically returned to the firing position, circuits for said motors comprising a main switch to start the first motor and contact timing devices driven in timed relationship with the shafts of said motors to control said circuits, whereby the motors are controlled and brought into operation in the desired time sequence after the first motor is started by the main switch, and means operably controlled by at least one of the tray-return means and breech-closing means automatically to actuate the firing mechanism and including a spring adapted to be loaded by the breech-block during run-out and to be released by the movement of the breech-block as the latter completes its closing movement, a firing plunger, a pressure-device to actuate the firing plunger, and control-means movable to an actuating position in which the pressure-device can be caused to operate the firing plunger, said control-means being movable to its actuating position as the cocking lever moves to its firing position whereby the firing plunger can be actuated only when the cocking lever is in the firing position.

18. A gun comprising in combination a breech, a loading tray movable between a loading position and a firing position, in which latter position the tray is bodily offset from the breech so that it is out of the way of the latter during recoil and is properly positioned to receive a round, means for closing said breech automatically on the insertion of a round therein, a firing mechanism including a firing pin and a cocking lever which is adapted to cock the firing pin and which is adapted to be moved to a firing position clear of the firing pin after the breech is closed, a fuze-setter comprising fuze-setting elements having relative movement lengthwise with respect to a round in the tray to engage and set a movable fuze-element of the round and then to separate the setting elements from the fuze-element, means for actuating the fuze-setter and thereafter in timed relationship the loading tray to move the latter from the firing position into the loading position, a rammer-device operably controlled in timed relationship with the actuating means to ram a round into the breech, means to actuate the rammer and thereafter to return the tray automatically to the firing position, and means to actuate the firing mechanism only when the cocking lever is in the firing position, said last-named means comprising a yielding pressure-device which is adapted to be operated by the tray when it reaches the firing position.

19. A gun comprising in combination a breech, a loading tray movable between a loading position and a firing position, in which latter position the tray is bodily offset from the breech so that it is out of the way of the latter during recoil and is properly positioned to receive a round, means for closing the breech automatically on the insertion of a round therein, a firing mechanism including a firing pin and a cocking lever which is adapted to cock the firing pin and which is adapted to be moved to a firing position clear of the firing pin after the breech is closed, a fuze-setter comprising fuze-setting elements having relative movement lengthwise with respect to a round in the tray to engage and set a movable fuze-element of the round and then to separate the setting elements from the fuze-element, means for actuating said fuze-setter and thereafter in timed relationship moving the loading tray from the firing position into the loading position, a rammer-device operably controlled in timed relationship with the actuating means to ram a round into the breech, means to actuate the rammer and thereafter to return the tray automatically to the firing position, and means to actuate the firing mechanism only when the cocking lever is in the firing position, said last-named means comprising a yielding pressure-device which is adapted to be operated by the tray when it reaches the firing position, an operating member for said pressure-device, levers linked to said operating member, and cam-surfaces on the tray arranged to engage said levers when the tray has moved away from the loading position.

20. A gun comprising in combination a breech, a loading tray movable between a loading position and a firing position, in which latter position the tray is bodily offset from the breech so that it is out of the way of the latter during recoil and is properly positioned to receive a round, and means for closing the breech automatically on the insertion of a round therein, firing mechanism for the gun, fuze-setting means adapted to set the fuze of a round in the loading tray, means for automatically actuating the fuze-setting means and the loading tray in timed relationship so that the fuze of the round is already set when the tray is in the loading position, a rammer-device operably controlled in timed relationship with the movement of the loading tray automatically to ram the round into the breech, an electrical motor to operate the rammer, a breech-operated switch to cut off the current to the motor on the ramming stroke and adapted to be broken by the breech-mechanism only when the breech-block has occupied a position behind the round to prevent the latter from coming out of the breech, and means associated with the breech to actuate the firing mechanism automatically when the breech is closed, whereby there is provided an automatic setting-loading-firing cycle giving a substantially constant dead-time for each round.

21. A gun comprising in combination a breech, a loading tray movable between a loading position and a firing position, in which latter position the tray is bodily offset from the breech so that it is out of the way of the latter during recoil and is properly positioned to receive a round, and means for closing the breech automatically on the insertion of a round therein, a firing mechanism including a firing pin and a cocking lever which is adapted to cock the firing pin and which is adapted to be moved to a firing position clear of the firing pin after the breech is closed, a fuze-setter comprising fuze-setting elements having relative movement lengthwise with respect to a round in the tray to engage and set a movable fuze-element of the round and then to separate the setting elements from the fuze-element, means for actuating the fuze-setter and thereafter moving the loading tray from the firing position into the loading position, said tray being automatically returned to the firing position after a round has been rammed, a rammer-device operably controlled in timed relationship with said actuating means to ram a round into the breech, an electrical motor to operate the rammer, a breech-operated-switch to cut off the current to the motor on the ramming stroke and adapted to be broken by the breech-mechanism only when the breech-block has occupied a position behind the round to prevent the latter from coming out of the breech and to be closed by said breech-mechanism to energize the rammer-motor-circuit only if the breech is open, and means operably controlled by at least one of the tray-return means and breech-closing means automatically to actuate the firing mechanism only when the cocking lever is in the firing position.

22. A gun comprising in combination a breech, a loading tray movable between a loading position and a firing position, in which latter position the tray is bodily offset from the breech so that it is out of the way of the latter during recoil and is properly positioned to receive a round, tray-actuating means comprising an electrical motor and a crank coupling the motor to the tray, whereby movements of the crank cause reciprocation of the tray, means for stopping the motor at the end of each stroke of the crank and tray, means for closing the breech automatically on the insertion of a round into the breech, firing mechanism for the gun, fuze-setting means adapted to set the fuze of a round in the loading tray, means for automatically actuating the fuze-setting means and the loading tray in timed relationship so that the fuze of the round is already set when the tray is in the loading position, a rammer device, means operably controlled in timed relationship with the movement of the loading tray to actuate said device and automatically to ram the round into the breech, and means associated with the breech to actuate the firing mechanism automatically when the breech is closed, whereby there is provided an automatic setting-loading-firing cycle giving a substantially constant dead-time for each round.

23. A gun comprising in combination a breech, a loading tray movable between a loading position and a firing position, in which latter position the tray is bodily offset from the breech so that it is out of the way of the latter during recoil and is properly positioned to receive a round, a limiting stop against which the tray is arranged to be moved, tray-actuating means comprising an electrical motor, a crank coupling the motor to the tray, whereby movements of the crank cause reciprocation of the tray, means for stopping the motor at the end of each stroke of the crank and tray, a resilient adjustable link between the crank and the loading tray, means for closing said breech automatically on the insertion of a round into the breech, firing mechanism for the gun, fuze-setting means adapted to set the fuze of a round in the loading tray, means for automatically actuating the fuze-setting means and the loading tray in timed relationship so that the fuze of the round is already set when the tray is in the loading position, a rammer-device, means operably controlled in timed relationship with the movement of the loading tray to actuate said device and automatically to ram the round into the breech, and means associated with the breech to actuate the firing mechanism automatically when the breech is closed, whereby there is provided an automatic setting-loading-firing cycle giving a substantially constant dead-time for each round.

24. A gun having a breech, a loading tray movable between a loading position and a firing position, in which latter position the tray is bodily offset from the breech so that it is out of the way of the latter during recoil and is properly positioned to receive a round, a limiting stop against which the tray is arranged to be moved, tray-actuating means comprising an electrical motor, a circuit for said motor, a crank coupling the motor to the tray, a resilient adjustable link between the crank and the loading tray and means to stop the motor at each stroke of the crank and tray, whereby movements of the crank cause reciprocation of the tray.

25. A gun comprising in combination a breech, a loading tray movable between a loading position and a firing position, in which latter position the tray is bodily offset from the breech so that it is out of the way of the latter during recoil and is properly positioned to receive a round, an electric motor to drive the loading tray, a circuit for said motor, breech-mechanism including a movable breech-block and means for closing the latter automatically on the insertion of a round into the breech, a switch operably connected with the breech-mechanism and controlling the tray-driving motor circuit for the tray return movement, firing mechanism for the gun, fuze-setting means adapted to set the fuze of a round in the loading-tray, means for automatically actuating the fuze-setting means and the loading tray in timed relationship so that the fuze of the round is already set when the tray is in the loading position, a rammer-device, means operably controlled in timed relationship with the movement of the loading tray to actuate said device and automatically to ram the round into the breech, and means associated with the breech to actuate the firing mechanism automatically when the breech is closed, said breech-switch keeping the tray-motor circuit open so that the tray cannot be moved from the loading position until the breech-block has occupied a position behind the round to prevent the latter from coming out of the breech, whereby there is provided an automatic setting-loading-firing cycle giving a substantially constant dead-time for each round.

26. A gun comprising in combination a breech, a loading-tray movable betwen a loading position and a firing position, in which latter position the tray is bodily offset from the breech so that it is out of the way of the latter during recoil and is properly positioned to receive a round, an electric motor to drive the loading tray, breech-mechanism including a movable breech-block and means for closing the breech-block automatically on the insertion of a round into the breech, a circuit for said tray-motor, and a switch controlling the tray-motor circuit for the tray-return movement, said switch keeping the circuit open so that the tray cannot be moved from the loading position until the breech-block has occupied a position behind the round to prevent the latter from coming out of the breech.

27. A gun comprising in combination a breech, a loading tray movable betwen a loading position and a firing position, in which latter position the tray is bodily offset from the breech so that it is out of the way of the latter during recoil and is properly positioned to receive a round, an electric motor to drive the loading tray, breech-mechanism including a movable breech-block and means for closing the breech automatically on the insertion of a round therein, a circuit for said tray-motor, and a change-over switch operated by part of the breech-mechanism and interrupting the tray-driving motor circuit so that the loading tray cannot be moved from the firing position to the loading position until the breech is opened.

28. A gun comprising in combination a breech, a loading tray movable between a loading position and a firing position, in which latter position the tray is bodily offset from the breech so that it is out of the way of the latter during recoil and is properly positioned to receive a round, an electric motor to drive the loading tray, a circuit for said motor, breech-mechanism including a movable breech-block and means for closing the breech automatically on the insertion of a round into the breech, a change-over switch operated by part of the breech-mechanism and controlling the tray-driving motor circuit, firing mechanism for the gun, fuze-setting means adapted to set the fuze of a round in the loading tray, means for automatically actuating the fuze-setting means and the loading tray in timed relationship so that the fuze of the round is already set when the tray is in the loading position, a rammer-device, means operably controlled in timed relationship with the movement of the loading tray to actuate said device and automatically to ram the round into the breech, and means associated with the breech to actuate the firing mechanism automatically when the breech is closed, said switch keeping the tray-motor-circuit open so that the loading tray cannot be moved from the firing position to the loading position until the breech is opened and from the loading position to the firing position until the breech-block has occupied a position behind the round to prevent the latter from coming out of the breech, whereby there is provided an automatic setting-loading-firing cycle giving a substantially constant dead-time for each round.

29. In a gun of the kind having a sliding breech-block which closes automatically on the insertion of a round into the breech and which is opened automatically after firing a spring providing the energy for closing the breech, a cocking device, a firing pin, means operated by the opening of the breech-block for actuating the cocking device to cock the firing pin and for loading the spring, means operated by closing the breech for automatically returning the cocking device to the firing position, a firing plunger, a pressure-device for operating the firing plunger, and control-means movable to an actuating position in which the pressure device can be caused to operate the firing plunger, said control-means moving to its actuating position as the cocking lever moves to its firing position whereby the firing plunger can be actuated only when the cocking lever is in the firing position.

30. For a gun of the kind having a sliding breech-block which closes automatically on the insertion of a round into the breech and which is opened automatically after firing, a firing pin, a cocking device to cock the firing pin, a spring providing the energy for closing the breech, means operated by opening the breech for actuating the cocking device to cock the firing pin and for loading the spring, means operated by closing the breech for automatically returning the cocking device to the firing position, a firing plunger, a pressure-device for operating the firing plunger, and control-means comprising an intermediate member which is operatively connected to and movable with the cocking device to an actuating position and through which the pressure device can operate the firing plunger when the cocking lever is in said firing position, said intermediate member preventing actuation of the firing plunger by such pressure device until the cocking device is in the firing position.

31. Automatic firing mechanism as claimed in claim 29, wherein the pressure device comprises a spring adapted to be loaded by the breech-block during run-out and wherein the spring is released by the movement of the breech-block as the latter completes its closing movement.

32. Automatic firing mechanism as claimed in claim 29, in combination with a gun of the kind having a loading tray movable between a loading position and a firing position, in which latter position the tray is bodily offset from the breech so that it is out of the way of the latter during recoil and is properly positionel to receive a round, and means for controlling said pressure-device and operated by the movement of the loading-tray whereby the pressure-device is inoperative until such time as the tray has reached the firing position.

33. Automatic firing mechanism as claimed in claim 29 in combination with a gun of the kind having a loading tray movable between a loading position and a firing position, in which latter position the tray is bodily offset from the breech so that it is out of the way of the latter during recoil and is properly positioned to receive a round, and means for controlling the said pressure-device and operated by the movement of the loading-tray, whereby the pressure-device is inoperative until such time as the tray has reached the firing position, said pressure device being yieldable and adapted to be actuated by the tray when the latter reaches the firing position.

34. Automatic firing mechanism as claimed in claim 29 in combination with a gun of the kind having a loading tray movable between a loading position and a firing position, in which latter position the tray is bodily offset from the breech so that it is out of the way of the latter during recoil and is properly positioned to receive a round, and means for controlling said pressure-device and operated by the movement of the loading-tray, whereby the pressure-device is inoperative until such time as the tray has reached the firing position, said pressure device being yieldable and adapted to be actuated by the tray when the latter reaches the firing position, and said control means comprising an actuating member for said pressure-device, levers linked to said member, and cam surfaces on the loading tray arranged to engage said levers and to actuate said pressure-device when the tray has moved to the firing position and the levers are operated by said cam surfaces.

35. Automatic firing mechanism as claimed in claim 30 in combination with a gun of the kind having a loading tray movable between a loading position and a firing position, in which latter position the tray is bodily offset from the breech so that it is out of the way of the latter during recoil and is properly positioned to receive a round, and means for controlling said pressure-device and operated by the movement of the loading tray, whereby the pressure-device is inoperative until such time as the tray has reached the firing position, said pressure device being yieldable and adapted to be actuated by the tray when the latter reaches the firing position, and said control-means comprising an actuating member for said pressure-device, levers linked to said member, and cam surfaces on the loading tray arranged to engage said levers and to actuate said pressure-device when the tray has moved to the firing position.

DESMOND WALTER MOLINS.
VALENTINE PEARCE HARVEY.
JAMES ARTHUR MASON.
GORDON FRANCIS WELLINGTON POWELL.

REFERENCES CITED

The following references are of record in the file of this patent:

UNITED STATES PATENTS

| Number | Name | Date |
|---|---|---|
| 393,436 | Koerner | Nov. 27, 1888 |
| 654,444 | Dawson et al. | July 24, 1900 |
| 697,126 | Becker | Apr. 8, 1902 |
| 770,320 | Schneider | Sept. 20, 1904 |
| 1,232,090 | Rimailho | July 3, 1917 |
| 1,302,520 | Dawson et al. | May 6, 1919 |
| 1,307,639 | Redpath et al. | June 24, 1919 |
| 1,326,789 | Schneider | Dec. 30, 1919 |
| 1,360,523 | Hadcock et al. | Nov. 30, 1920 |
| 1,438,670 | Standish | Dec. 12, 1922 |
| 1,464,171 | Dawson et al. | Aug. 7, 1923 |
| 1,517,758 | Schneider | Dec. 2, 1924 |
| 1,656,727 | Dawson et al. | Jan. 17, 1928 |
| 1,753,850 | De Courseulles | Apr. 8, 1930 |
| 1,664,676 | Goetzenberger | Apr. 3, 1928 |
| 2,261,194 | Vickers | Nov. 4, 1941 |

FOREIGN PATENTS

| Number | Country | Date |
|---|---|---|
| 13,500 | Great Britain | 1907 |
| 395,555 | France | Jan. 4, 1909 |
| 605,879 | France | Feb. 26, 1926 |